(12) United States Patent
Bergeron et al.

(10) Patent No.: US 12,459,137 B2
(45) Date of Patent: Nov. 4, 2025

(54) SYSTEMS, DEVICES, ARTICLES, AND METHODS FOR PREHENSION

(71) Applicant: Ocado Innovation Limited, Hatfield (GB)

(72) Inventors: Nicolas Normand Bergeron, San Mateo, CA (US); Thomas John Hummel, San Mateo, CA (US)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 18/323,095

(22) Filed: May 24, 2023

(65) Prior Publication Data

US 2023/0302665 A1    Sep. 28, 2023

Related U.S. Application Data

(62) Division of application No. 15/912,932, filed on Mar. 6, 2018, now abandoned.

(Continued)

(51) Int. Cl.
*B25J 15/08* (2006.01)
*B25J 9/04* (2006.01)
(Continued)

(52) U.S. Cl.
CPC ............. *B25J 15/08* (2013.01); *B25J 9/046* (2013.01); *B25J 9/1045* (2013.01); *B25J 9/1075* (2013.01); *B25J 9/1607* (2013.01); *B25J 9/1612* (2013.01); *B25J 9/1669* (2013.01); *B25J 9/1694* (2013.01); *B25J 13/083* (2013.01); *B25J 13/084* (2013.01); *B25J 13/088* (2013.01);
(Continued)

(58) Field of Classification Search
CPC ........ B25J 9/046; B25J 9/1045; B25J 9/1075; B25J 9/1067; B25J 9/1612; B25J 15/024; B25J 13/083; B25J 13/084; B25J 13/088; B25J 15/008; B25J 15/0085
See application file for complete search history.

(56) References Cited

U.S. PATENT DOCUMENTS

2006/0012198 A1 * 1/2006 Hager ................. B25J 9/1612
294/106
2009/0025502 A1 * 1/2009 Nakamoto ........... B25J 15/0009
901/31

(Continued)

*Primary Examiner* — Khoi H Tran
*Assistant Examiner* — Tristan J Greiner
(74) *Attorney, Agent, or Firm* — Seed Intellectual Property Law Group LLP

(57) ABSTRACT

An end-effector may include a base, a plurality of underactuated fingers coupled to the base; and an adhesion gripper coupled to the base. An end-effector may include a base, an actuator, a first underactuated finger comprising a proximal link and a distal link, the proximal link including a distal end, a guide for a first tendon spaced a first distance away from the distal end of the proximal link and the distal link including a lever arm disposed on a proximal side to the distal pad and which extends in a volar direction from a first axis, and a node disposed on the lever arm sized and shaped to receive a first tendon. The end-effector may include a first revolute joint compliant in a first direction disposed between the base and the proximal link; and a second revolute joint compliant in the first direction disposed between the proximal link and the distal link.

8 Claims, 17 Drawing Sheets

Related U.S. Application Data

(60) Provisional application No. 62/515,910, filed on Jun. 6, 2017, provisional application No. 62/473,853, filed on Mar. 20, 2017.

(51) Int. Cl.
| | |
|---|---|
| *B25J 9/10* | (2006.01) |
| *B25J 9/16* | (2006.01) |
| *B25J 13/08* | (2006.01) |
| *B25J 15/00* | (2006.01) |
| *B25J 15/02* | (2006.01) |
| *B25J 15/06* | (2006.01) |
| *G01L 5/22* | (2006.01) |
| *G06F 17/12* | (2006.01) |
| *G06F 17/16* | (2006.01) |

(52) U.S. Cl.
CPC ......... *B25J 15/0009* (2013.01); *B25J 15/008* (2013.01); *B25J 15/0085* (2013.01); *B25J 15/024* (2013.01); *B25J 15/0616* (2013.01); *G01L 5/228* (2013.01); *G05B 2219/39505* (2013.01); *G05B 2219/39543* (2013.01); *G05B 2219/40564* (2013.01); *G06F 17/12* (2013.01); *G06F 17/16* (2013.01)

(56) References Cited

U.S. PATENT DOCUMENTS

| | | | | |
|---|---|---|---|---|
| 2009/0148263 | A1* | 6/2009 | Lee | B25J 9/1045 414/735 |
| 2012/0330453 | A1* | 12/2012 | Samak Sangari | B25J 15/0616 700/121 |
| 2014/0097631 | A1* | 4/2014 | Ciocarlie | B25J 9/1075 901/31 |
| 2016/0075537 | A1* | 3/2016 | Lundin | F16L 11/00 138/104 |
| 2016/0318190 | A1* | 11/2016 | Prahlad | H01L 21/6833 |
| 2017/0203443 | A1* | 7/2017 | Lessing | B25J 15/10 |

* cited by examiner

SYSTEMS, DEVICES, ARTICLES, AND METHODS FOR PREHENSION

CROSS REFERENCE TO RELATED APPLICATIONS

The present application is a divisional application of U.S. patent application Ser. No. 15/912,932 filed on Mar. 6, 2018, which claims priority to U.S. Provisional Application Nos. 62/473,853 filed on Mar. 20, 2017 and 62/515,910 filed on Jun. 6, 2017, and which are incorporated by reference herein. Where the present application and a document incorporated by reference conflict, the present application controls.

BACKGROUND

Technical Field

The present disclosure relates to mechanical robotic grippers or end-effectors and, more particularly, to end-effectors including underactuated devices, adhesion devices, and hybrid devices.

Description of the Related Art

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

End-Effectors

An end-effector or end of arm tool is a device attached to a robotic arm, manipulator, or appendage designed or structured to interact with an environment. Examples of end-effectors include grippers or graspers. End-effectors for robot operating in unstructured environments are devices of complex design. Ideally, these can perform many tasks, including for example grasp or grip or otherwise physically releasably engage or interact with an item or object.

BRIEF SUMMARY

An underactuated end-effector including at least one finger that includes a distal link including a first axis, a distal pad dispose on the distal link, a lever arm disposed on a proximal side to the distal pad extending in a volar direction from the first axis. The lever arm includes a node to receive a tendon.

An end-effectors may be summarized substantially as described and illustrated herein.

A system may be summarized as including an end-effector and a robot substantially as described and illustrated herein.

A system may be summarized as including an end-effector and a processor-based device substantially as described and illustrated herein.

A method of operation of an end-effector may be summarized substantially as described and illustrated herein.

A device may be summarized as including a base; an actuator coupled to the base; a first underactuated finger coupled to the base, wherein the first finger includes a proximal link coupled to the base, wherein the proximal link includes a distal end; and a guide for a first tendon spaced a first distance away from the distal end of the proximal link; a distal link coupled to the proximal link and which extends along a first axis, wherein the distal link includes a lever arm disposed on a proximal side to the distal pad and which extends in a volar direction from the first axis; and a node disposed on the lever arm sized and shaped to receive a first tendon.

The device may further include a first revolute joint compliant in a first direction disposed between the base and the proximal link; and a second revolute joint compliant in the first direction disposed between the proximal link and the distal link.

The device may further include a first spring that biases the proximal link to a first open position; and a second spring that biases the distal link to a second open position. A first net torque may bias the proximal link to the first open position; a second net torque may bias the distal link to the second open position; and the first net torque may be less than the second net torque. A first tensile force along the first tendon may actuate the proximal link relative to the base; a second tensile force along the first tendon may actuate the distal link relative to the proximal link; and the first tensile force may be less than the second tensile force.

The distal link may further include a distal pad disposed on a volar side of the first axis.

The proximal link may further include a proximal pad disposed on a volar side of the proximal link.

The device may further include a second finger.

A system may be summarized as including a base; an actuator coupled to the base; a plurality of fingers coupled to the base, wherein at least one of the plurality of fingers includes a proximal link comprising a first body and a guide; a first joint that couples the proximal link to the base, wherein the first joint is compliant in a first direction; a distal link including a first axis; a distal pad disposed on a volar side of the first axis; and a lever arm disposed on a proximal side to the distal pad and which extends in a volar direction from the first axis; and a second joint that couples the distal link to the proximal link; and a plurality of tendons, wherein a first respective tendon in the plurality of tendons is associated with the first respective finger; couples to a first lever arm of a first distal link of the first respective finger; routes through a first guide included in a first proximal link of the first respective finger; and couples to the actuator.

The system may further include an adhesion gripper coupled to the base.

An end-effector may be summarized as including a base; a plurality of underactuated fingers coupled to the base; and an adhesion gripper coupled to the base.

The adhesion gripper may be a vacuum gripper including a suction cup facing a distal direction; a vacuum passage in fluid communication with the suction cup; and a vacuum source in fluid communication with the vacuum passage.

The base may include a rest; the suction cup may include a distal periphery; and the distal periphery of the suction cup may sit proud of the rest.

The adhesion gripper may be an electrostatic gripper including a dielectric body coupled to the base; a plurality of electrodes embedded in the dielectric body; and a power source selectively electrically coupled to the plurality of electrodes.

A system may be summarized as including a robot including an end-effector; at least one processor communicatively coupled to the end-effector; and at least one nontransitory processor-readable storage device communicatively coupled to the at least one processor and which stores processor-executable instructions which, when executed by the at least one processor, cause the at least one processor to receive, at the at least one processor, tactile sensor data from a plurality tactile sensors; temporally difference, by the at least one processor, the tactile sensor data; compute, by the at least one processor, a plurality of correlations for the temporally differenced tactile sensor data; mask, by the at least one processor, a set of masked pairs of tactile sensor data in the tactile sensor data; detect, by the at least one processor, one or more non-zero correlations in the plurality of correlations; and create, by the at least one processor, at least one output signal that includes information that represents the one or more non-zero correlations in the plurality of correlations. The plurality of tactile sensors may include a plurality of force sensors, or a plurality of pressure sensors. The plurality of tactile sensors may be coupled to the end-effector.

To receive the tactile sensor data from a plurality tactile sensors, when executed, the processor-executable instructions may further cause the at least one processor to receive, at the at least one processor, a plurality of spatial values and a plurality of temporal values.

When executed, the processor-executable instructions may further cause the at least one processor to store the plurality of spatial values and the plurality of temporal values.

To compute the plurality of correlations for the temporally differenced tactile sensor data, when executed, the processor-executable instructions may further cause the at least one processor to compute, by the at least one processor, a covariance matrix from the plurality of spatial values and the plurality of temporal values.

To mask the set of masked pairs of tactile sensor data in the tactile sensor data, when executed, the processor-executable instructions may further cause the at least one processor to mask, by the at least one processor, a set of correlations in the plurality of correlations for the temporally differenced tactile sensor data that correspond to the set of masked pairs of tactile sensor data.

When executed, the processor-executable instructions may further cause the at least one processor to cause an increase in prehension on an item in contact with the end-effector.

The end-effector may include a plurality of fingers; and to cause the increase in prehension on the item in contact with the end-effector, when executed, the processor-executable instructions may further cause the at least one processor to tighten a grip on the item by the plurality of fingers.

The end-effector may include an adhesion gripper; and to cause the increase in prehension on the item in contact with the end-effector, when executed, the processor-executable instructions may further cause the at least one processor to actuate the adhesion gripper.

An end-effector may be substantially as described and illustrated herein.

A system may include an end-effector and a robot substantially as described and illustrated herein.

A system may include an end-effector and a processor based device substantially as described and illustrated herein.

A method of operation of an end-effector may be substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which.

DETAILED DESCRIPTION

Figure 1:
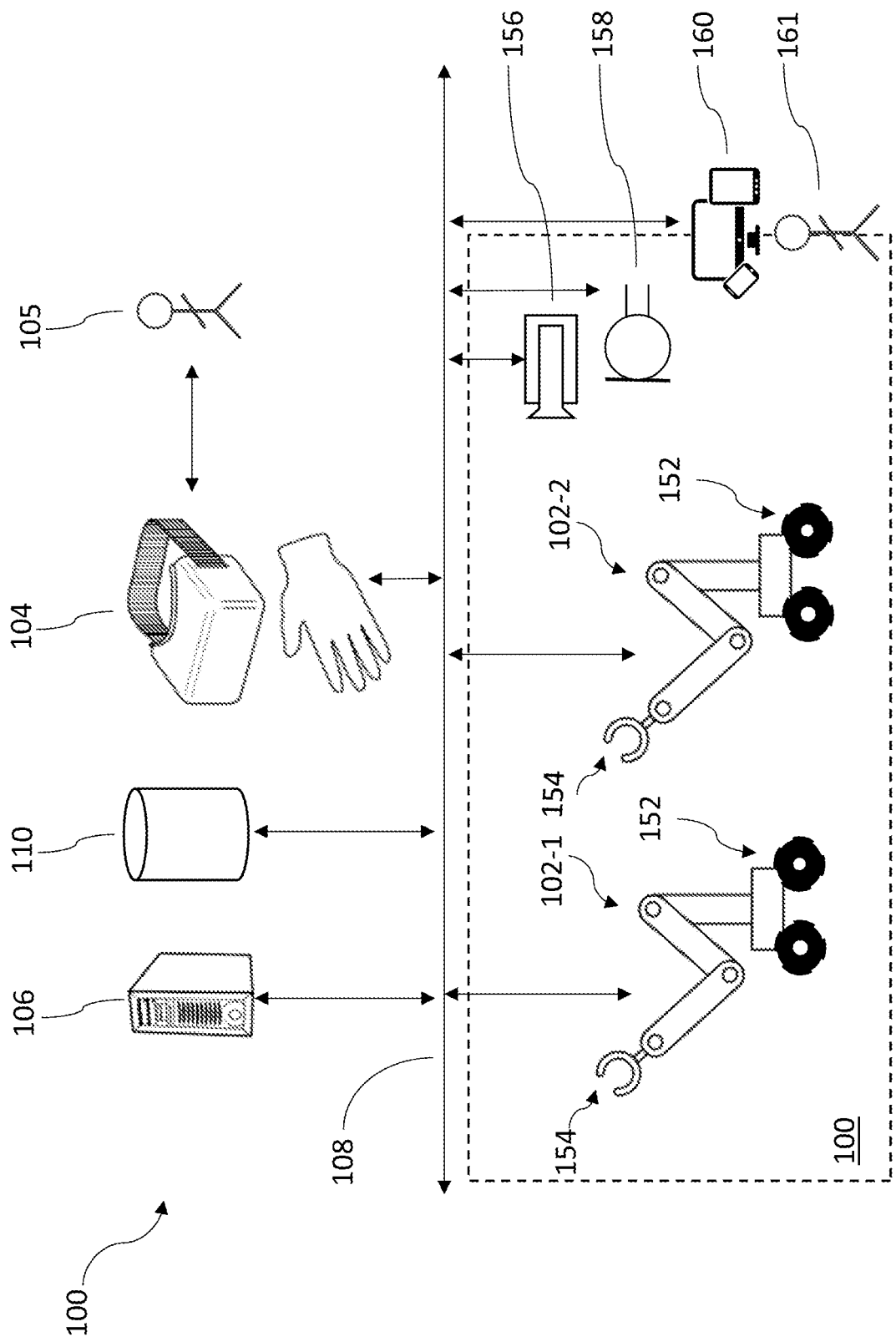
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an end-effector" includes an end-effector, or two or more end-effectors. It should also be noted that the term "or" is generally employed in its sense including "and/or" unless the content clearly dictates otherwise.

The headings provided herein are for convenience only and do not interpret the scope or meaning of the embodiments.

Herein mechanical and homologous anatomical terminology is used. The anatomical terminology parallels that for the human body or a part like the hand. However, the terms palmar or volar have less meaning here. This contributes to confusion of the motions flexion and extension, and adduction and abduction. In a human hand, flexion moves fingers closer to the palm, itself the palmar face of the body of the hand. In human fingers, revolute joints or knuckles allow the fingers to curl in flexion toward the palm. In abduction, or spreading, of the fingers do not move closer to the palm. For example, in a Vulcan salute there is abduction of middle and ring fingers while the fore and little finger are keep pressed against their inward neighbors. In some end-effectors the fingers move toward the center line of the end-effector in a motion like adduction and may include causing a curl of the fingers in a motion like flexion.

Traditional end-effectors to manipulate general items need to satisfy contradictory requirements. Small and light end-effectors are desirable but so are strong and durable end-effectors. By selecting end-effectors that are underactuated, that is, designed and structured to have fewer actuators than degrees-of-freedom, some of these requirements decouple from one another. These underactuated end-effectors may be referred to as adaptive or self-adaptable. That is, the end-effector remains effective, e.g., preserves capability, under conditions of unforeseen change in the properties of the item or workpiece. The fingers conform to the item. Self-adaptable end-effectors are useful when grasping various items of different geometries because of the ability of the fingers to conform to different items.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes a nontransitory computer- and processor-readable storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robots 102. In some implementations, the one or more sensors are external to or separate from robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any color ball, depending on the features extracted from the sensor data, and kicking the ball. In the absence of a ball, the robot executing the autonomous robot control instructions would not kick the air as if a ball was present.

In some implementations, the computer system 106 is a smaller processor-based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2.) A sensor subsystem which acquires data that characterizes or represents the robots 102 in a context or scenario, and/or performing one or more tasks. The data includes environmental sensor information, or environment information, representative of environmental conditions external to robots 102.

System 100 includes an observer interface system. System 100 includes one or more observer interfaces 160 coupled to network or non-network communication channel 108. The observer interfaces 160 include input or output parts. An example of an output part is a display of explanatory text or a dynamic representation of robots 102 in a context or scenario. For example, the dynamic representation robot includes video and audio feed, for instance a computer-generated animation. Useful video and audio formats include H264 and Opus respectively. Example of an input part includes a WIMP interface. An observer 161 may observe or monitor the operation of system 100, robots 102 or the like from observer interfaces 160.

Figure 2:
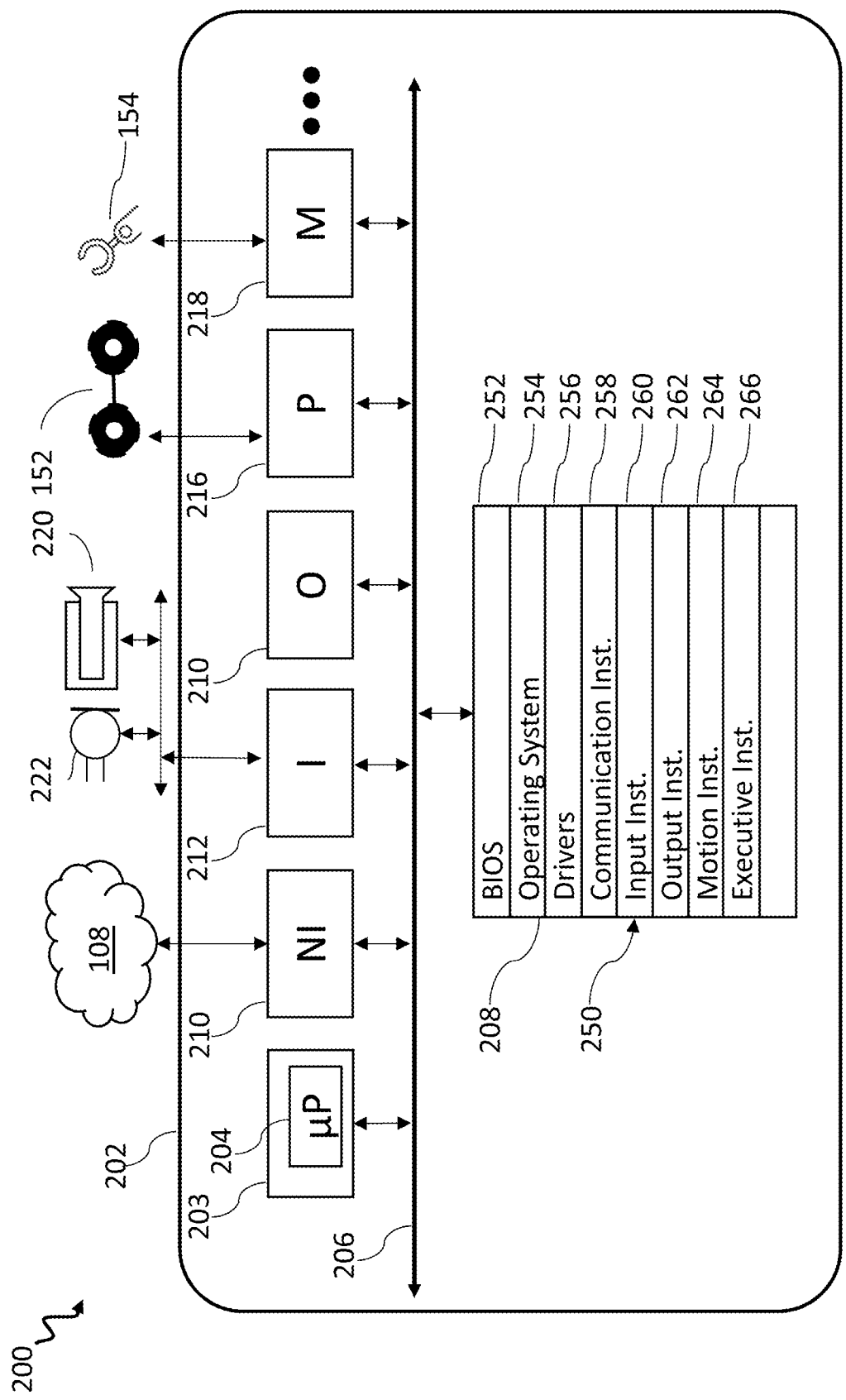
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends data related partition of a plurality of items. Network interface subsystem 210 may be any circuitry effecting bidirectional communication of processor-readable data, and processor-executable instructions, for instance radios (e.g., radio or microwave frequency transmitters, receivers, transceivers), communications ports and/ or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like.

Robot 200 includes an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 may include a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, manipulators, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions or data 250 can, for example, include a basic input/output system (BIOS) 252, an operating system 254, drivers 256, communication instructions or data 258, input instructions or data 260, output instructions or data 262, motion instructions or data 264, and executive instructions or data 266.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216. For example, processor-executable motion instructions or data 264 may perform motion planning, inverse kinematics, or other motion related tasks. Processor-executable motion instructions or data 264 may implement, in part, various methods described herein, including those in and in relation to FIG. 10.

The processor-executable executive instructions or data 266 guide the robot 200 in reasoning, problem solving, planning tasks, performing tasks, and the like. The processor-executable executive instructions or data 266 may implement, in part, various methods described herein, including those in and in relation to FIG. 10.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
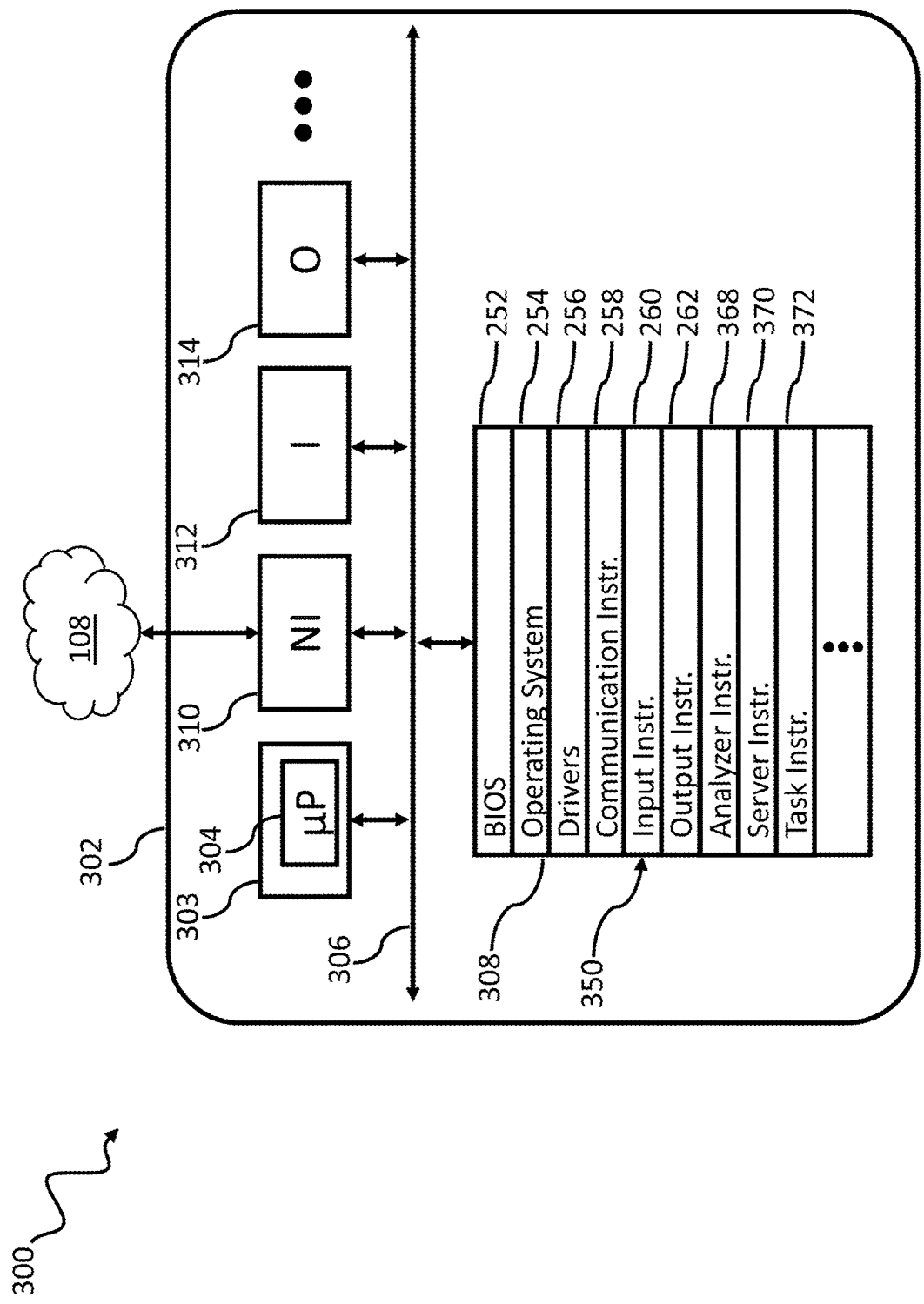
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with observers, warehouse management systems, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data (even reference numbers 252-262) are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, and processor-executable partition instructions or data 372. The processor-executable analyzer instructions or data 368, processor-executable server instructions or data 370, and processor-executable executive instructions or data 372 may implement, in part, various methods described herein, including those in and in relation to FIG. 10.

Processor-executable analyzer instructions or data 368, when executed by control subsystem 304, generates autonomous robot control instructions. Processor-executable server instructions or data 370, when executed by processor(s) 304, guide system 300 to coordinate the operation of system 100, and/or to act as a mediator between robots 102, computer system 106, and the like.

Figure 4:
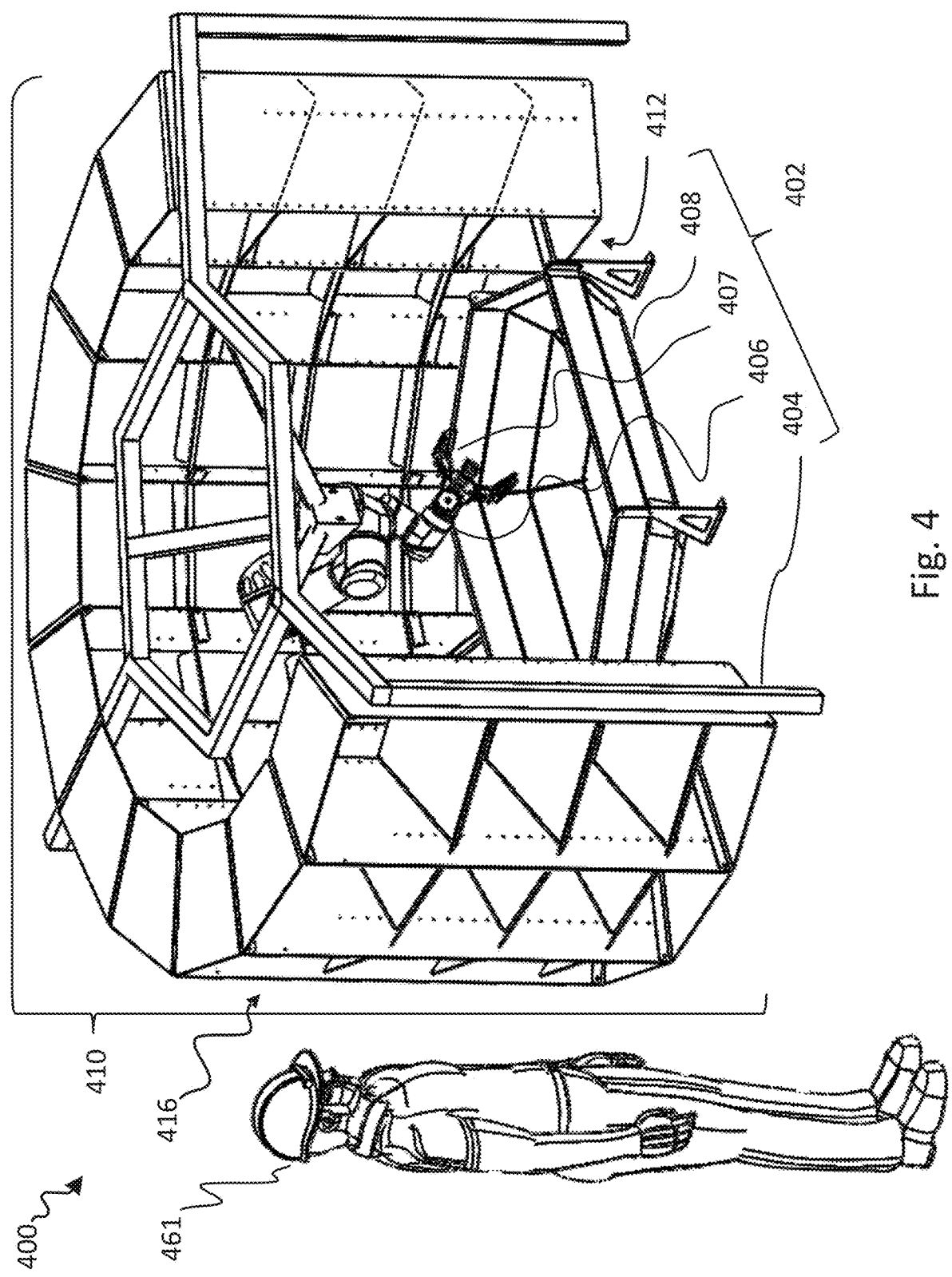
FIG. 4 illustrates, in a perspective view, an exemplary device that includes at least one arm and end-effector.

FIG. 4 illustrates, in a perspective view, an exemplary device 400 in accordance with the present systems, articles, and methods, along with a worker 461. Device 400 includes at least one end-effector 407.

Device 400 includes an input part 402 and an output part 410. In some implementations, input part 402 includes a frame 404 which may be coupled or connected to a base, e.g., floor, ground, or platform. One or more multi-joint manipulators 406, e.g., robotic arm, may be coupled or connected to frame 404. Manipulator(s) 406 may couple to at least one end-effector 407 distally disposed on manipulator(s) 406 relative to frame 404. A manipulator included in the one or more multi-joint manipulators 406 is a mechanism which includes an assembly of links and joints. Links include rigid sections and joints are the couplers or connector between two links and allowing relative movement between the two links. Herein device 400 and methods described herein are described as being performed by manipulator and end-effector. However, device 400 and methods described herein, such as method 1000, may include at least one manipulator or end-effector.

The manipulator(s) 406 and associated end-effector(s) 407 may move articles, work pieces, or items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of reception spaces 412 (e.g., cubbies) that may be accessed from the opposite side 416.

Manipulator(s) 406 may couple to at least one end-effector 407 distally disposed on manipulator(s) 406 relative to frame 404. Herein device 400 and methods 800, 900, 1000, et seq. are described as being performed by manipulator and end-effector. However, device 400 and methods described herein may include at least one manipulator or end-effector.

The manipulator(s) 406 and associated end-effector(s) 407 may interact with an environment or items within the environment. The manipulator(s) 406 and associated end-effector(s) 407 may move items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of cubbies 412 that may be accessed from the opposite side 416.

Manipulator(s) 406 may, for example, be a lightweight six joint industrial robot arm, such as, a UR5™ from Universal Robots NS of Odense, DK-83. The UR5 arm has a lifting ability of 5 Kg and have a working radius of 850 mm. Frame 404 may be sized to allow robot arm 406 to move largely unimpeded by frame 404. Manipulator(s) 406 may be a six joint robot arm, such as, a CR-7iA™ and CR-7iA/L™ robot arm from Fanuc America Corp., Rochester Hills, MI, US.

The CR-7iA arm has a lifting ability of 7 Kg and have a working radius of 717 mm and 911 mm for the CR-7iA/L™ arm.

Figure 5:
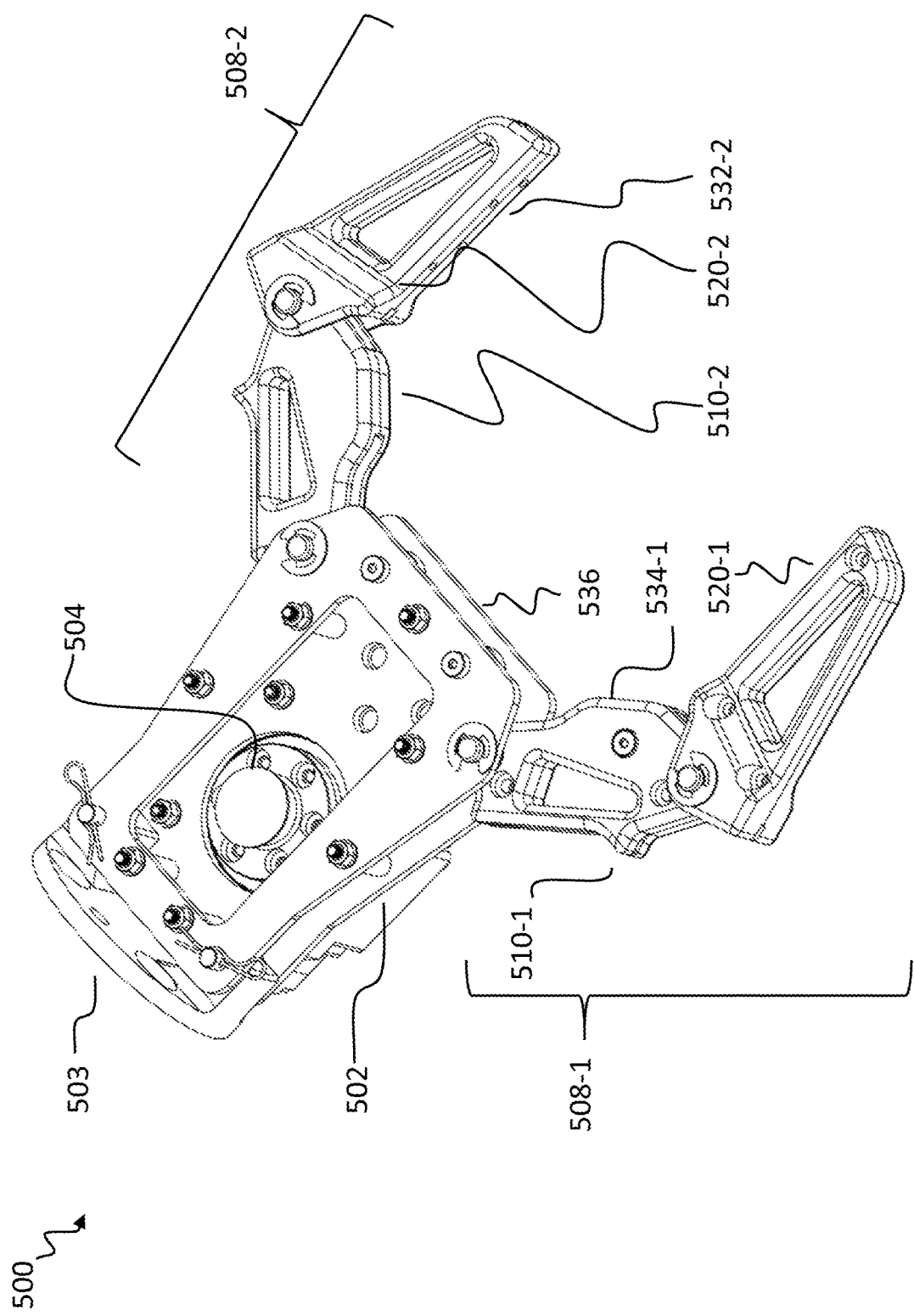
FIG. 5 illustrates, in a perspective view, an exemplary device that may be included in an end-effector.

FIG. 5 illustrates an exemplary device 500 that may serve as or part of an end-effector, such as, end-effector 407 show in FIG. 4. Device 500 includes base 502, a body to which other components may be coupled, e.g., connected. Base 502 may be made of metal, plastic, or composite in one or more parts. Base 502 is a link including two or more nodes. Device 500 may be coupled to another component such as manipulator 406 or robot 102-1. For example, device 500 may include an attachment point 503, which may be part of base 502, or a separate body coupled to base 502, e.g., rigidly coupled.

In at least one implementation, device 500 includes an actuator 504 coupled to base 502. The actuator 504 could be a rotatory actuator, such as a servo or motor coupled to a windlass directly or via a gear train, shaft, belt, chain or the like. Actuator 504 could be a linear actuator. One or more tensile members may be coupled to and pulled by actuator 504. Actuator 504 may draw in or pull, or release or let out a tensile member.

In at least one implementation, device 500 includes a plurality of fingers 508. In some implementations, the fingers 508 are underactuated. In some implementations, the plurality of fingers 508 includes two fingers. In some implementations, a first finger in the plurality of fingers 508 opposes a second finger in the plurality of fingers 508.

A respective finger in the plurality of fingers 508 includes a proximal link 510-1, 510-2 (collectively 510) that may be described as phalange or segment. Proximal link 510, such as proximal link 510-1 and 510-2, is a body and specifically a compressive member. Proximal link 510 includes at least two nodes for that can act as couplers to other links, such as, base 502.

A respective finger in the plurality of fingers 508 includes a distal link 520-1 and 520-2 (collectively 520) that may be described as phalange or segment. Distal link 520, such as distal link 520-1 and 520-2, includes at least two nodes that can act as couplers to other links, such as, proximal link 510 or other components, such as, actuator 504 via a tensile member. In some implementations, one or more links in the plurality of fingers 508 includes pads disposed on the volar side of the link, such as, links 510 and 520. The volar area of device 500 is defined below. For example, distal link 520-2 may be associated with a distal volar pad, e.g., 532-2, included or coupled to the volar side of a distal link 520-2. In some implementations, proximal link 510-1 is associated with a proximal volar pad 534-1 included, or coupled to, the volar side of proximal link 510-1. The pads disposed on the volar side of links such as a distal volar pad, e.g., 532-2 may include ingressive devices or surface treatment such as pins, spines, scales, or ridges that physically penetrate a surface of the item. The pads disposed on the volar side of links include contigutive devices or surface treatment such as coating, liquids, smoothed surface, or ridges that creates an adhesion by glue, surface tension or the like. The pads disposed on the volar side of links such as a distal volar pad, e.g., 532-2 may include a plurality of tactile elements or tactels.

Device 500 may include a rest 536 that serve as a palm in device 500 but defines what looks like the edge of a purlicue in the human hand, i.e., space between finger and thumb. The rest 536 may be defined by part of base 502 or at least one body coupled to base 502. Rest 536 defines the volar area and thus the volar direction for device 500.

Figure 6:
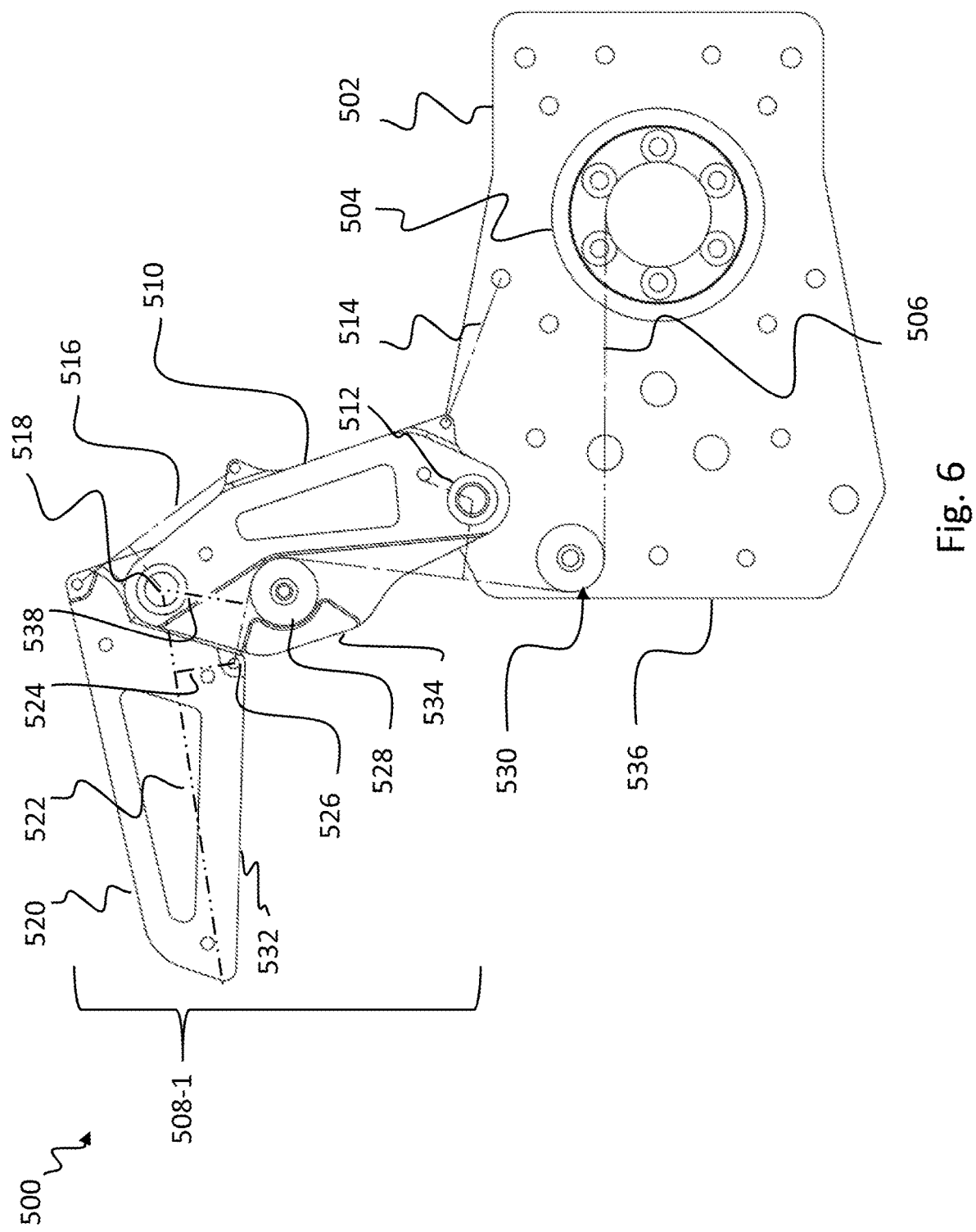
FIG. 6 illustrates, in a cross-section, a portion of the device shown in FIG. 5.

FIG. 6 illustrates a portion exemplary device 500 in a cross-sectional view taken in a plane defined by base 502 and the span of plurality of fingers 508. Device 500 includes base 502, actuator 504, and one finger of the plurality of fingers 508 (other fingers omitted to provide an enlarged view).

In at least one implementation, device 500 includes a plurality of tendons. Actuator 504 may drive one or more tendons in the plurality of tendons, such as, a tendon 506. A respective tendon in the one or more tendons is a tensile member or a body that transmits axial tensile forces. The body may, or may not, transmit a compressive force, and may, or may not, be pliant, supple, or flexible. Examples of tensile members include belt, cable, chain, cord, rope, strap, string, web, webbing, wire, or combinations thereof.

A respective finger in the plurality of fingers 508 includes a proximal link 510 that may be described as phalange or segment. Proximal link 510 is a body and specifically a compressive member. Proximal link 510 includes at least two nodes that can act as couplers to other links, such as, base 502.

A respective finger in the plurality of fingers 508 includes a first joint 512 that couples the proximal link 510 to base 502. First joint 512 may be a revolute joint around a first axis transverse to a general plane of the base 502 which, as draw, is in and out of the drawing page. The proximal link 510, and any associated distally disposed links, may be compliant in, at least, a first direction.

Device 500 includes a first spring 514. The first spring 514 may be an extension spring or member made of resilient material (e.g., rubber or metal) that resists forces that lengthens it. In some implementations, the first spring 514 may be a torsion spring that resists torques. First spring 514 biases the proximal link 510 to an open position. Device 500 includes a second spring 516 that biases a distal link 520 to the open position.

A respective finger in the plurality of fingers 508 includes a second joint 518 that couples the proximal link 510 to distal link 520. Second joint 518 may be a revolute joint around the first axis transverse to a general plane of the base 502, a near parallel access, or a different axis. In some implementations, the distal link 520 and proximal link 510 are compliant in, at least, the first direction.

In various implementations, the first spring 514 and the second spring 516 in combination with geometry of the base 502, proximal link 510, and distal link 520 lead to differing net torques to actuate first joint 512 versus second joint 518. The net torque needed to actuate the first joint 512 may be less than the net torque needed to actuate the second joint 518.

Distal link 520 is a body, phalange, or segment and includes a first axis 522 that extends along the principal or major extent of the distal link 520. Distal link 520 includes a lever arm 524 designed and structured to extend in an inward or volar direction from first axis 522 to a node 526. Tendon 506 may be coupled to node 526. In response to tension on tendon 506 a force is exerted on node 526 and causes, via lever arm 524, the distal link 520 to move in a volar direction. The tensile force on tendon 506 creates a torque of distal link 520. The greater the length of lever arm 524 the more torque can be applied for a given actuator 504. In some implementations, the length of lever arm 524 is 15% the length of the first axis 522 of distal link 520. Length of level arm 524 can be defined as distance between first axis 522 of distal link 520 and node 526. The lever arm 524 may be in length between 10% and 20% (inclusive) the length of the first axis 522. In some implementations, the length of the lever arm 524 is between 10% and 30% (inclusive) the length of the first axis 522. The lever arm 524 may be in length between 5% and 20% (inclusive) the length of the first axis 522. In some implementations, the length of the lever arm 524 is between 5% and 30% (inclusive) the length of the first axis 522.

In some implementations, proximal link 510 includes a guide 528 which directs (e.g., receives and directs) at least one tendon of tendons 506. Device 500 may include one or more additional guides 530 coupled to, e.g., included in base 502, and which directs tendon 506. A guide can include a block, bushing, channel, drum, eyelet, fairlead, pad eye, passage, pulley sheave, ring, roller, sliding contact surface, or the like.

Proximal link 510 may be sized and shaped to position guide 528 a distance 538 away from the distal end of proximal link 510 or away from the second joint 518. By spacing guide 528 (and more particularly the point of guide that receives tendon 506 extending from distal link 520) away from the distal end of proximal link 510 (or away from the second joint 518) the proximal link 510 and guide 528 provide a lever arm for the actuation of second joint 518 and/or distal link 520. The greater distance 538 the more torque can be applied for a given actuator 506. In some implementations, the distance 538 is 25% the length of the proximal link 510. The distance 538 may be a length between 22% and 27% (inclusive) the length of proximal link 510. The distance 538 may be a length between 20% and 30% (inclusive) the length of proximal link 510. The distance 538 may be a length between 5% and 50% (inclusive) the length of proximal link 510.

In some implementations, one or more links is the plurality of finders 508 includes pads disposed on the volar side of the link. For example, distal link 520 may be associated with a distal volar pad 532 included or coupled to the volar side of distal link 520. The distal volar pad 532 may be distally disposed relative to lever arm 524. In some implementations, proximal link 510 is associated with a proximal volar pad 534 included, or coupled to, the volar side of proximal link 510, e.g., near guide 528.

Device 500 includes a rest 536. The plurality of fingers may hold items against rest 536. Items may be engaged by various parts of device 500 including rest 536, distal link 520, and proximal link 510. Although FIG. 6 was described in reference to one finger in a plurality of fingers, device 500 may include further like or unlike fingers.

Figure 7:
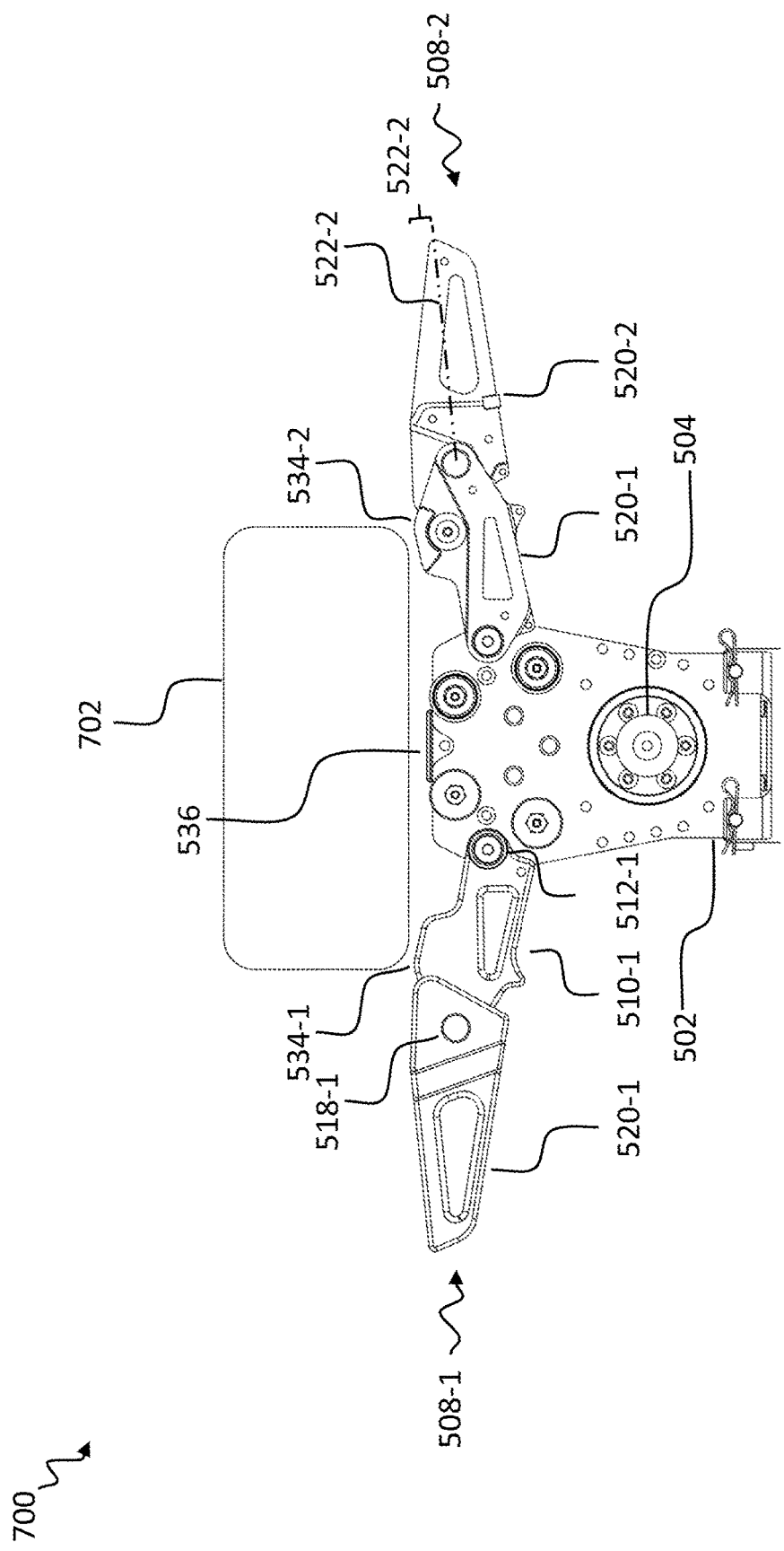
FIG. 7 illustrates the device shown in FIG. 5 in an early stage of a grasp of an item.
Figure 8B:
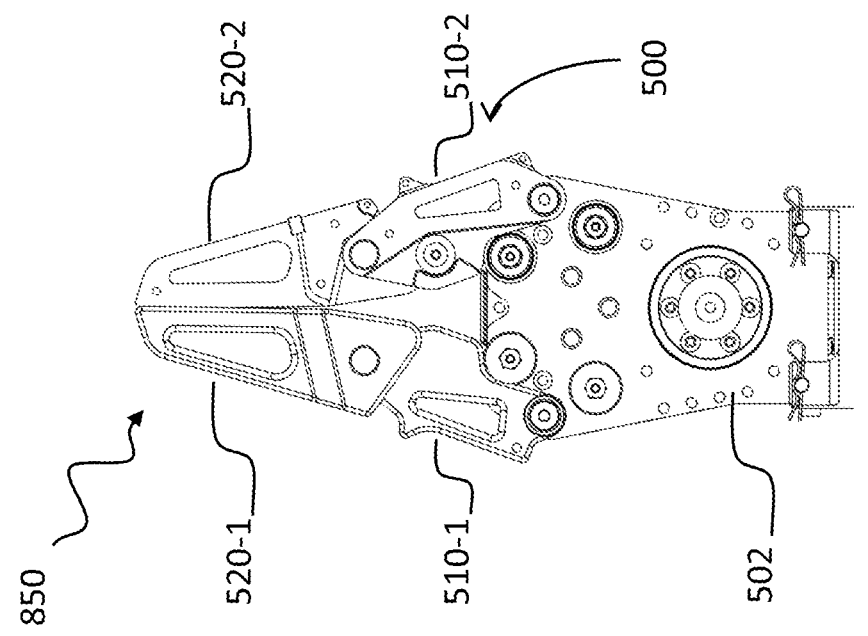
FIG. 8B illustrates an example of the device shown in FIG. 5 that failed to grasp of an item.
Figure 8A:
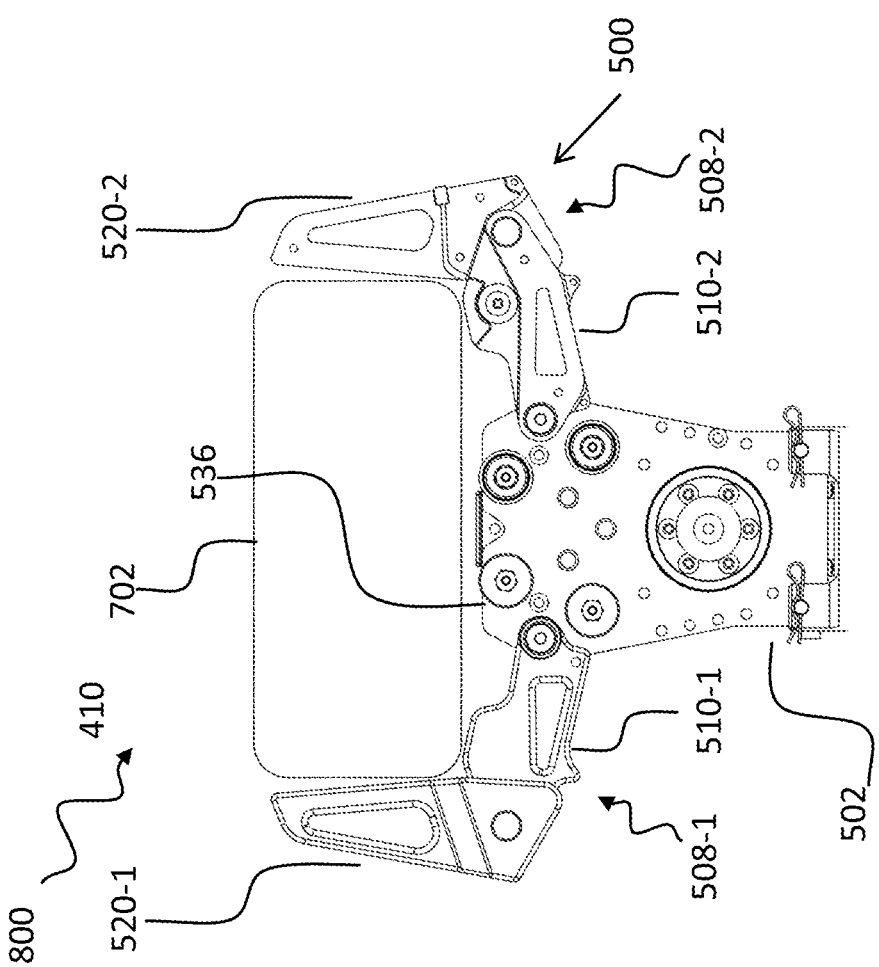
FIG. 8A illustrates the device shown in FIG. 5 mid grasp of an item.

FIG. 7 illustrates device 500 in an early stage of a grasp of an item 702. FIG. 8A illustrates device 500 mid-grasp (i.e., releasably engaged, temporarily under prehension) of item 702. FIG. 8B illustrates device 500 with a plurality of fingers closed and not around an item.

FIG. 7 illustrates device 500 in an early stage of a grasp of an item 702. Device 500 uses a single tendon to effect flexion of two or more links in a respective finger in the plurality of fingers 508. Device 500 uses a plurality of springs (e.g., spring 514 and spring 516 shown in FIG. 6) for extension of the respective finger. Flexion and extension of proximal links 510-1 and 510-2 and distal links 520-1 and 520-2 is described herein at, at least, FIGS. 7, 8A, and 8B. Herein, a description of flexion or extension may be given for one finger. In some implementations, device 500 may include one finger, or two or more fingers. All, or a fewer number of, fingers in a device like device 500 can undergo flexion or extension.

A tendon (not shown) in a finger (e.g., finger 508-2) is selectively driven by actuator 504 and allows for retraction control and adjustability of the grasping compliance. Retraction is a volar motion that moves a link towards rest 536 or center line of device 500.

Unlike some designs, during flexion in device 500, the retraction of proximal link 510 and distal link 520 are not connected (e.g., are independent, are loosely coupled). Thus, force provided by actuator 504 and in turn the force required for the distal link 520 to comply to, or "close around", an item is decoupled, e.g., isolated, from the force moving the proximal link 510 and effectively the entire finger.

When device 500 is included in an end-effector, such as arm and end-effector 154, device 500 may grasp soft or fragile items. The underactuated fingers 508 may assume a "wrapped" pose which includes compliance of distal link 510 but it found with existing designs that the proximal link exerts too great of a force on the item that it contacts before the distal link can generate enough torque to comply. That is, when an end-effector including device 500 grasps a fragile item, the end-effector would crush the item with the proximal link before the distal finger links closes around it.

In a grasp, a proximal link, such as, proximal link 510-1, makes contact with a resilient item, e.g., item 702, then torque around the first joint 512-1 is transferred to the second joint 518-1. That is, item 702 provides sufficient resistance and retards (e.g., prevents) proximal link 510-1 from (from) movement. The distal link 520-1 curls in, i.e., moves in volar direction. The distal link 520-1 includes lever arm 524, shown and described in at least FIG. 6, that converts tension on a tendon into torque on distal link 520-1 about second joint 518-1. That is, the tendon torques distal link 520-1 toward rest 536, in a volar or inward direction, toward close, or the like.

FIG. 8A shows, in contrast to FIG. 7, an arrangement of articles 800 including device 500 and item 702. Device 500 is in mid-grasp of item 702. In a grasp the underactuated fingers 508 may assume a "wrapped" pose which includes compliance of distal links 510. That is, device 500 has releasably engaged item 702; item 702 is under prehension; and the like. In some implementations torque around one or more second joint 518-1 or 518-2 causes one or more distal links 520-1 or 520-2 to draw item 702 toward rest 536.

It was found with existing designs of including underactuated fingers that the proximal links can exert too great of a force on the item before the distal link can receive enough torque to comply. That is, when a fragile item is to be grasped, the end-effector would crush the item with the proximal link before the distal finger links close around the item.

FIG. 8B illustrates arrangement 850 of device 500 that has failed to grasp of an item (not shown). That is the fingers have closed without or without sufficient hold or purchase on an item. In some implementations, distal links 520-1 and 520-2 mate as do the proximal links 510-1 and 510-2.

Figure 9:
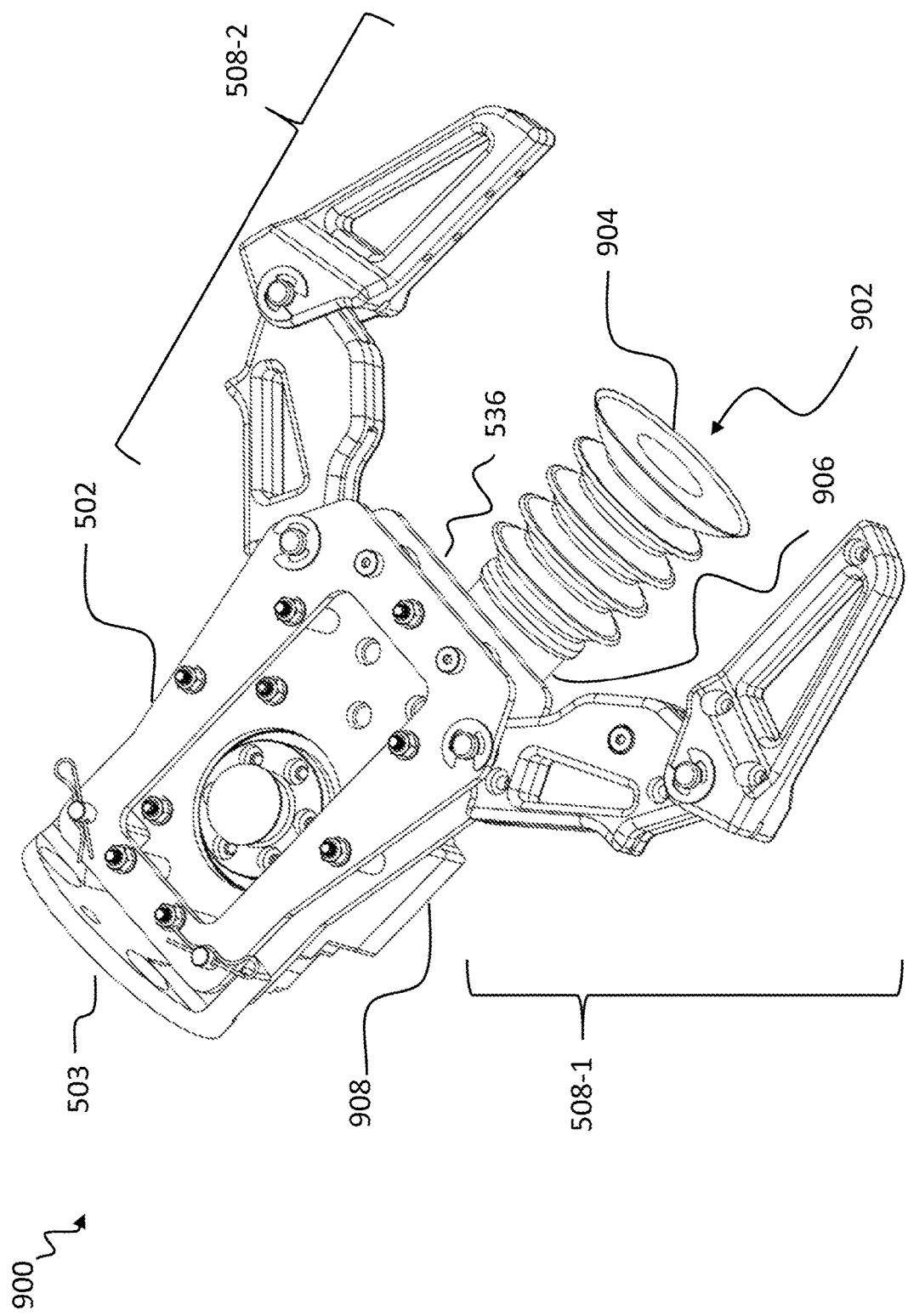
FIG. 9 illustrates, in a perspective view, exemplary devices that may be included in an end-effector, the devices including an adhesion device.

FIG. 9 illustrates device 900 which includes a body 502 coupled to a plurality of fingers 508, and an adhesion gripper 902 to aid fingers 508.

Integration of the adhesion gripper increases the number of items that an end-effector can grasp and/or manipulate. It has been demonstrated that with a given grasp opening, some items can be difficult to close the end-effector's fingers 508 around. An adhesion gripper, e.g., vacuum gripper or electrostatic gripper, can counteract this disability.

Figure 11:
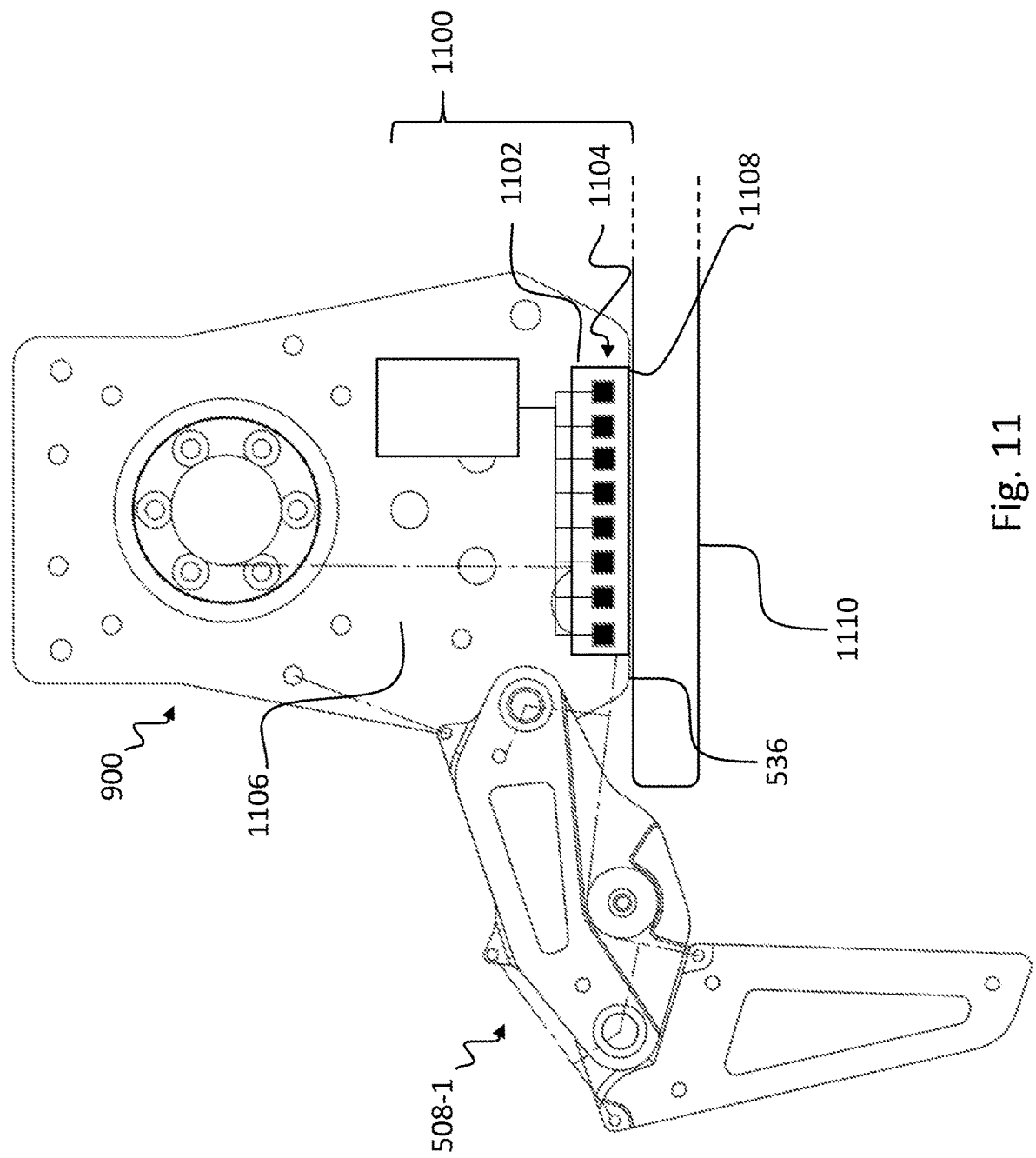
FIG. 11 illustrates, in a cross-sectional view, an exemplary adhesion device that may be included in an end-effector.

Device 900, as illustrated, includes a vacuum gripper. A suction cup 904 is disposed near rest 536. For example, suction cup 904 is disposed adjacent to body 502 and sits proud of rest 536. In some implementations, suction cup 904 includes a distal periphery that sits proud of rest 536. Suction cup 904 is in fluid communication with a vacuum passage 906 leading to a vacuum source 908. Vacuum source 908 can include ports (not shown) for power or control. The vacuum source 908 can be connected to base 502 or located elsewhere including on another part of a robot (not shown). Device 900 can include an electrostatic adhesion device, i.e., a gripper that provides prehension by electrostatic attraction. An example of an electrostatic adhesion device, adhesion device 1100, is shown in FIG. 11.

The adhesion gripper may include a Bernoulli gripper, an example, of a vacuum gripper. A Bernoulli gripper, not shown, exploits the airflow between the gripper and the item for or under prehension and causes an attractive force, e.g., lifting force, which brings the gripper and item close each other via the Bernoulli effect. In some implementations, during some grasps the items and Bernoulli gripper will be in contact at one or more points on the item and close at, at least, one point on the item. A Bernoulli gripper includes a gripper face including one or more ports in fluid communication with an air, or vacuum, source that generates a velocity airstream in an outward, or inward, direction from the one or more ports. The velocity airstream has per the Bernoulli effect a lower pressure than the surrounding atmosphere and thus creates an attractive force toward the gripper face. A plurality of standoffs may be defined on the gripper face prevent the item and the gripper face from mating.

The electrostatic gripper (shown in and described in relation to FIG. 11) may comprise: a dielectric body, a plurality of electrodes embedded in the dielectric body, and a power source selectively electrically coupled to the plurality of electrodes. For example, the dielectric body may sit proud or shy of rest 536. The power source can be used to, for example in response to the execution of processor readable instructions, create a charge in the plurality of electrodes embedded in the dielectric body and attract and item to the dielectric body.

Figure 10:
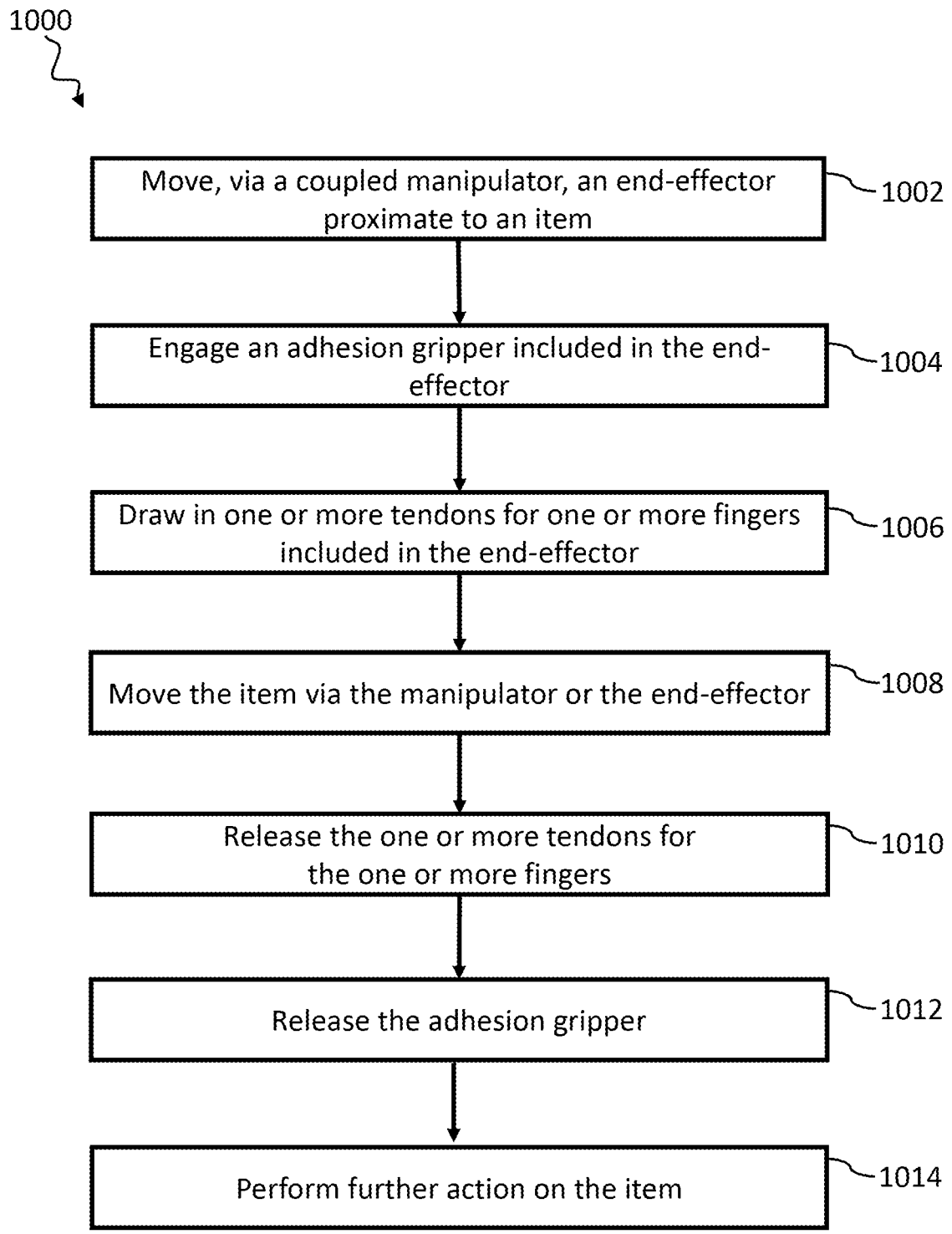
FIG. 10 is a flow-diagram illustrating an implementation of a method of operation for a system including an end-effector.

FIG. 10 shows method 1000 executable by a controller, such as circuitry or at least one hardware processor, for operation in a robotic system. Method 1000, in part, describes how a controller releasably engages an item. Those of skill in the art will appreciate that other acts may be included, removed, and/or varied or performed in a different order to accommodate alternative implementations. Method 1000 is described as being performed by a controller, for example, a control subsystem or processor(s) in computer system 106 or system 200, in conjunction with other components, such as those found in, system 100, computer system 106, robot 200, and system 300. However, method 1000 may be performed by multiple controllers or by another system.

For performing part or all of method 1000, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 1000 one or more robots may be included in the operation of a robotic system. Exemplary robots and components are described herein.

Method 1000 begins, for example, in response to an invocation by the controller.

At 1002, the controller causes, via a manipulator (e.g., an arm or manipulator 406) coupled to an end-effector, the end-effector to be moved to a first position proximate to an item. For example, the controller causes end-effector 500 to be moved such that an item (e.g., item 702) is proximate to rest 536. The controller may perform, or cause another processor to perform, the execution of processor readable instructions in support of causing the end-effector to be moved to the first position proximate to the item. For example, perform inverse kinematics to guide motion of the manipulator or the end-effector. The controller may execute processor-executable motion instructions or data 264 shown in, and described in relation to, FIG. 2 in support of, or to cause, the end-effector to move to the first position proximate to the item.

At 1004, the controller causes an adhesion gripper included in the end-effector to engage an item. For example, the controller executes processor-executable instructions stored on a computer- and processor-readable storage device and in response an adhesion gripper (e.g., vacuum gripper, electrostatic gripper) included in device 900 actives and increases the adhesion between the end-effector and the item. The engagement between the item and the end-effector may be a loose engagement.

At 1006, the controller causes an actuator to draw in one or more tendons providing flexion to one or more fingers, e.g., underactuated fingers 508. That is, the controller executes processor-executable instructions stored on a computer- and processor-readable storage device and in response to the execution the one or more fingers begin to close around the item following processes and outcomes described herein at, at least, FIGS. 7, 8A, and 8B.

At 1008, the controller causes the manipulator (e.g., an arm or manipulator(s) 406) or the end-effector to move the item. At 1010, the controller causes the actuator to release, in part or full, the one or more tendons. For example, the controller causes extension of the one or more fingers. At 1012, if applicable the controller causes the adhesion gripper to release, in part or full, the item. That is, the controller executes processor-executable instructions stored on a computer- and processor-readable storage device and in response to the execution the manipulator moves the item, releases the tendons, causes extension in the one or more fingers, reduces adhesion in the adhesion gripper, removes adhesion in the adhesion gripper, or release the item. At 1014, the controller may cause further actions to be performed by on the item.

Method 1000 ends, for example at 1012 or 1014, until invoked again.

FIG. 11 illustrates an electrostatic adhesion device 1100 which may be included in device 900 or the like. Adhesion device 1100 includes: a dielectric body 1102, a plurality of electrodes (collectively or individually 1104) embedded in the dielectric body 1102, and a power source 1106 selectively electrically coupled to the plurality of electrodes. The dielectric body 1102 may include, e.g., be defined in part by, an interface 1108 that may sit proud or shy of any part of an end-effector, e.g., rest 536. Power source 1106 can be used to, for example in response to the execution of processor readable instructions, create a charge in the plurality of electrodes 1104 embedded in the dielectric body 1106 and attract an item 1110 to the dielectric body 1102. For example, a controller in response to executing processor executable instructions selectively electrically couples power source 1106 to plurality of electrodes 1104.

An adhesion device, such as, adhesion device 1100 may aid fingers, e.g., finger 508-1. For example, an end-effector may use the adhesion device 1100 to bring an item or workpiece under prehension in response to creating a charge imbalance at the plurality of electrodes 1104 and then stabilize or further secure the item by closing one or more fingers around the item. A potential disadvantage of electrostatic adhesive devices, such as those shown and described herein, is the possibility for two matted surfaces, one on the dielectric body 1102 and the other on the item, to peel away from each other. The peeling away effect starts at an edge or corner of the mated surfaces where the surfaces move out of an effective distance for adhesion and effect cascades from there. Therefore, adhesion device 1100 may be used in combination with one or more fingers (e.g., finger 508-1) such as those shown herein.

Figure 12:
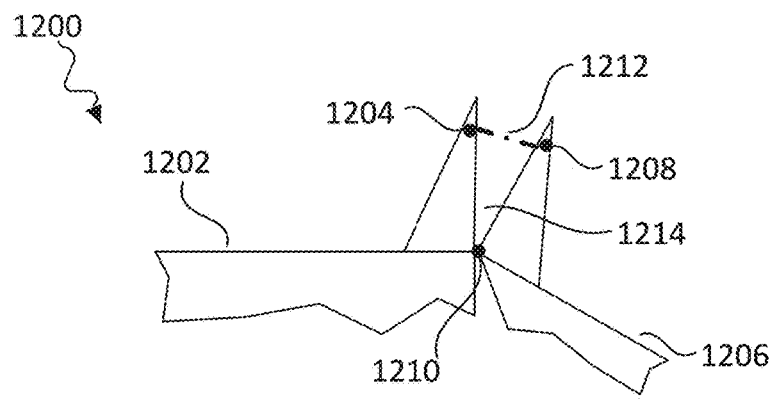
FIG. 12 illustrates, in a cross-sectional view, a part of a revolute joint that may be included in an end-effector.

FIG. 12 illustrates a part of a revolute joint 1200 that may be included an end-effector, such as, end-effector 407 show in FIG. 4. Revolute joint 1200 includes a first link 1202 with a first lever 1204, and a second link 1206 with a second lever 1208 extending from the same side as the first lever 1204 is disposed. The first link 1202 and the second link 1206 are revolutely coupled by a joint 1210. A spring 1212 biases the relative motion of the first link 1202 and the second link 1206. An angle 1214 defines the change in orientation of the first link 1202 and the second link 1206.

The illustrated part of revolute joint 1200 is useful to describing how an end-effector like end-effector 500 may operate. If the first lever 1204 has a first length, a, the second lever 1208 has a second length, b, and the angle 1214 is denoted, θ, then the distance, x, spanned by spring 1212 is given by a formula based on the law of cosines.

$$x^2 = a^2 + b^2 - 2 \cdot a \cdot b \cdot \cos(\theta) \tag{1}$$

If the force required to extend the spring is Hookean, linear in the elongation of the spring, the force on a tendon used to actuate a spring biased revolute joint is non-linear in the angle of the joint. This non-linearity has a feature that the force required to actuate the revolute joint increases with displacement, then plateaus and declines. An example of such a response of a revolute joint is shown in FIGS. 13A and 13B.

Figure 13A:
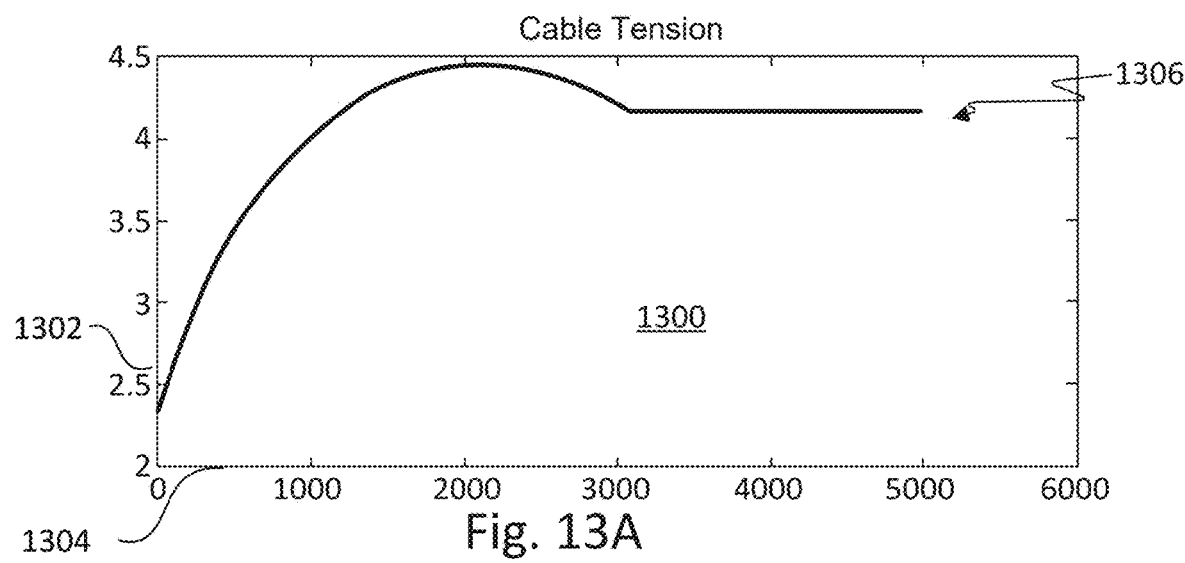
FIGS. 13A and 13B show a pair of line graphs showing physical properties for an end-effector.
Figure 13B:
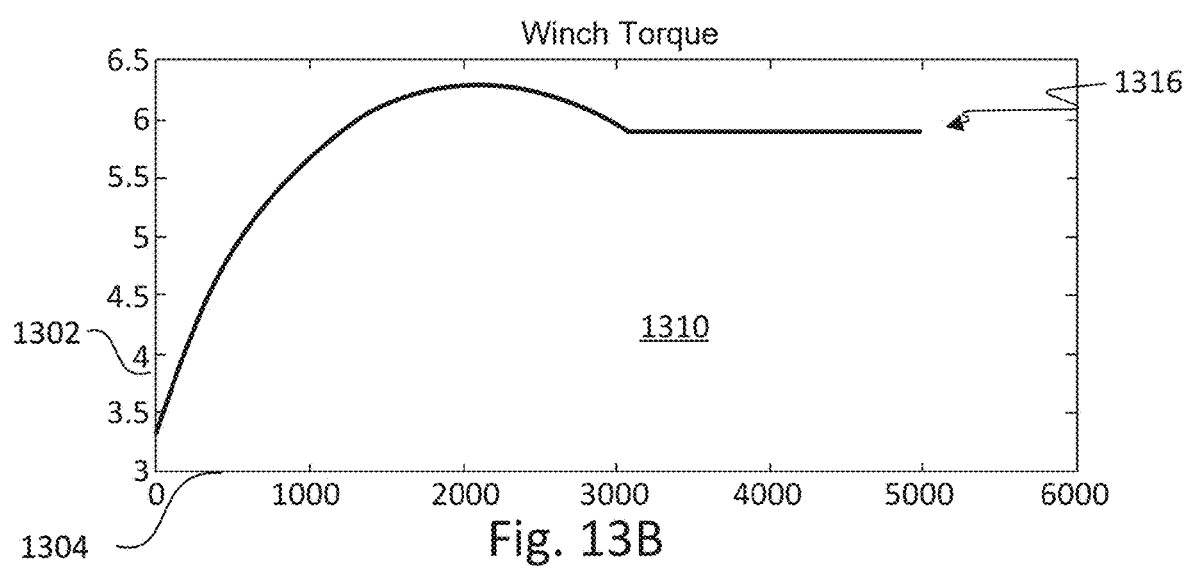

FIGS. 13A and 13B include a pair of line graphs (graphs 1300 and 1310) showing physical properties for an end-effector including a spring biased revolute joint, such as, joint 1200. Graph 1300 includes a tension axis 1302, in arbitrary units of force, plotted against angle of a revolute joint on axis 1304. The curve 1306 includes a non-linear response in increasing angle, here in arbitrary units. The force, here tension in tendon, needed to move the spring biased revolute joint increases with angular displacement, then plateaus, and then declines. Graph 1310 includes a torque axis 1312, in arbitrary units of torque, plotted against angle of a revolute joint on axis 1314. The curve 1316 includes a non-linear response in increasing angle. For a winch, an example of actuator 504 shown above, to move the revolute joint the torque follows a similar shape to curve 1306.

Figure 14A:
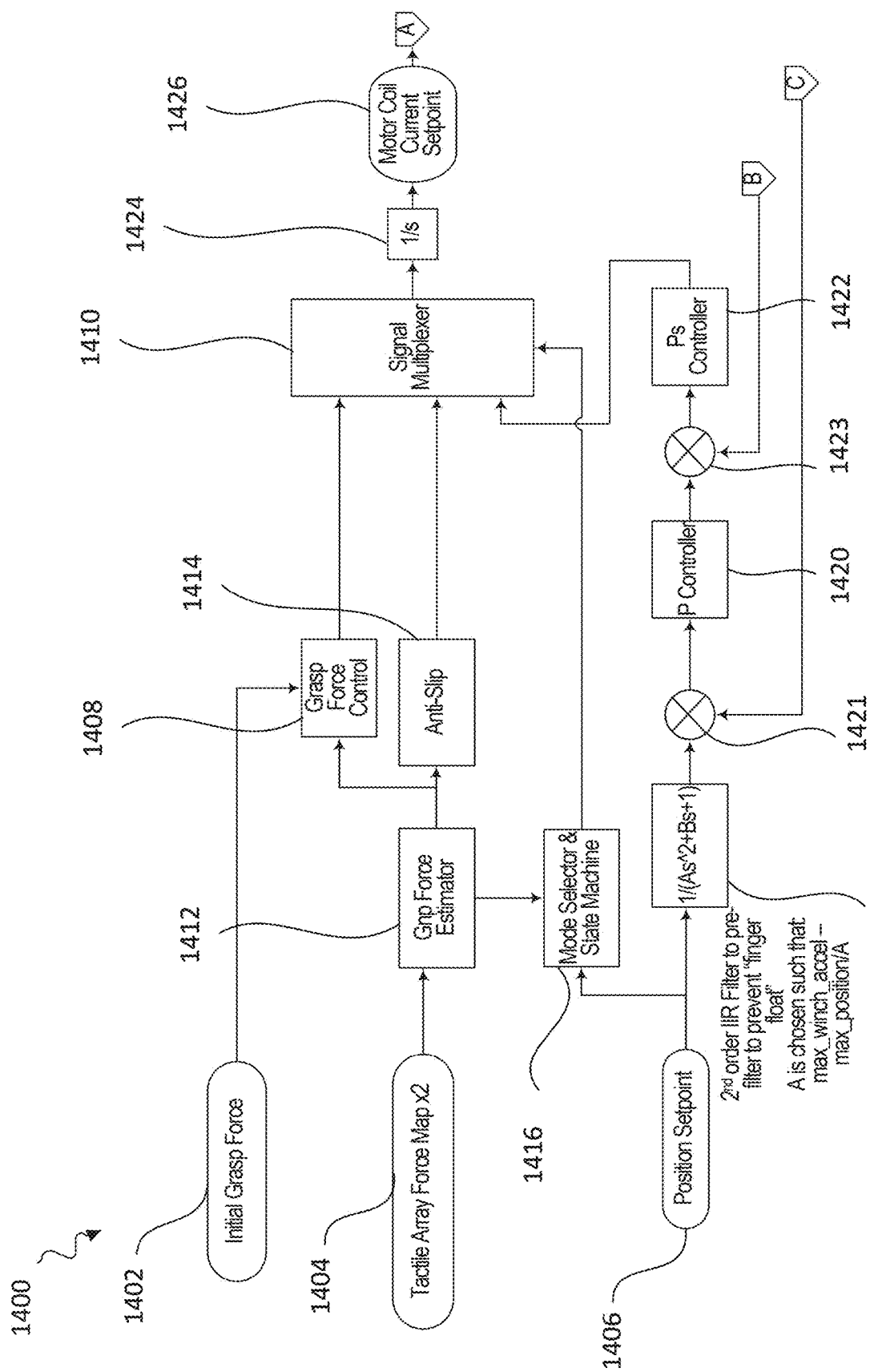
FIGS. 14A, 14B, and 14C illustrate, schematically, a control system for an end-effector.
Figure 14B:
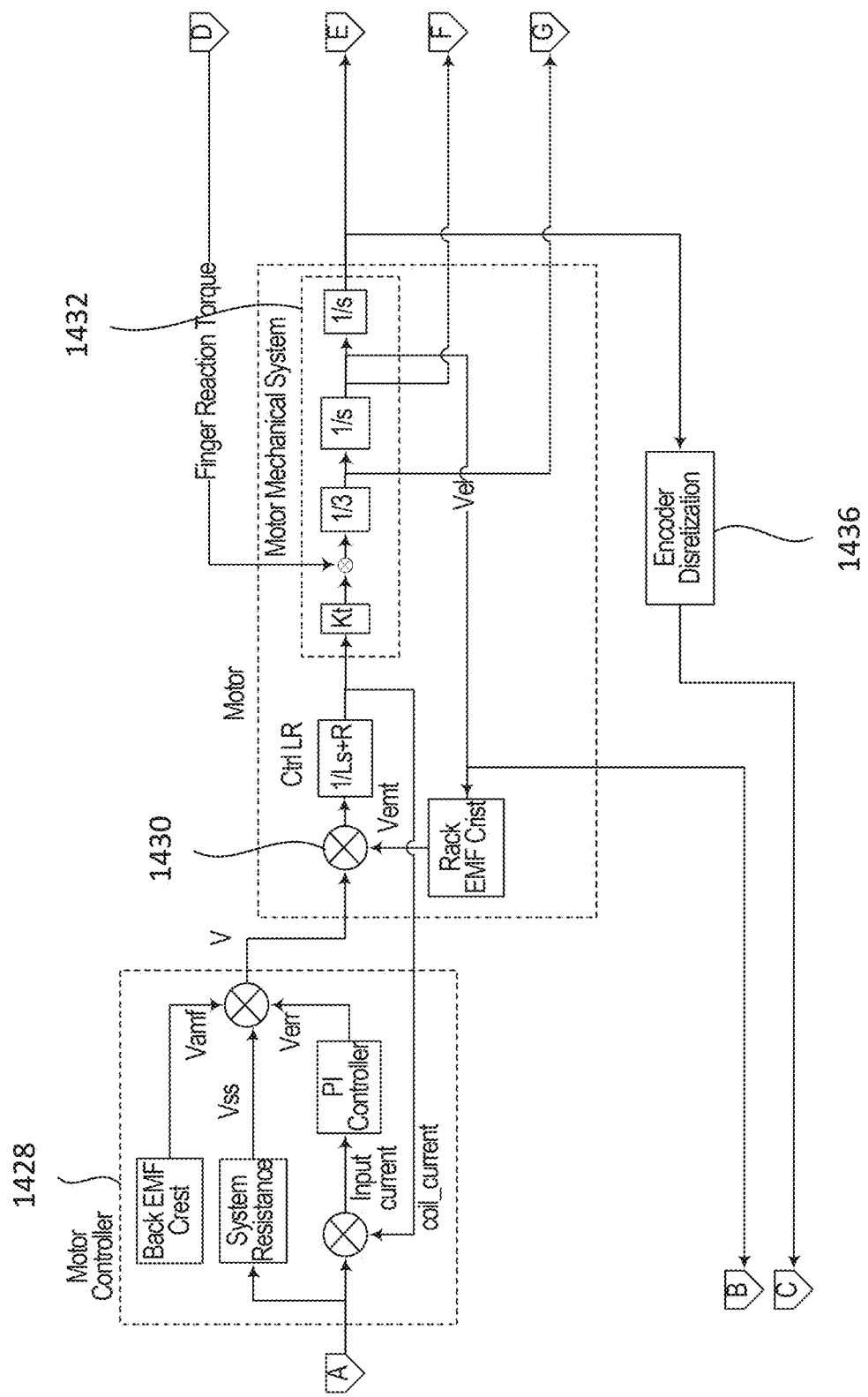
Figure 14C:
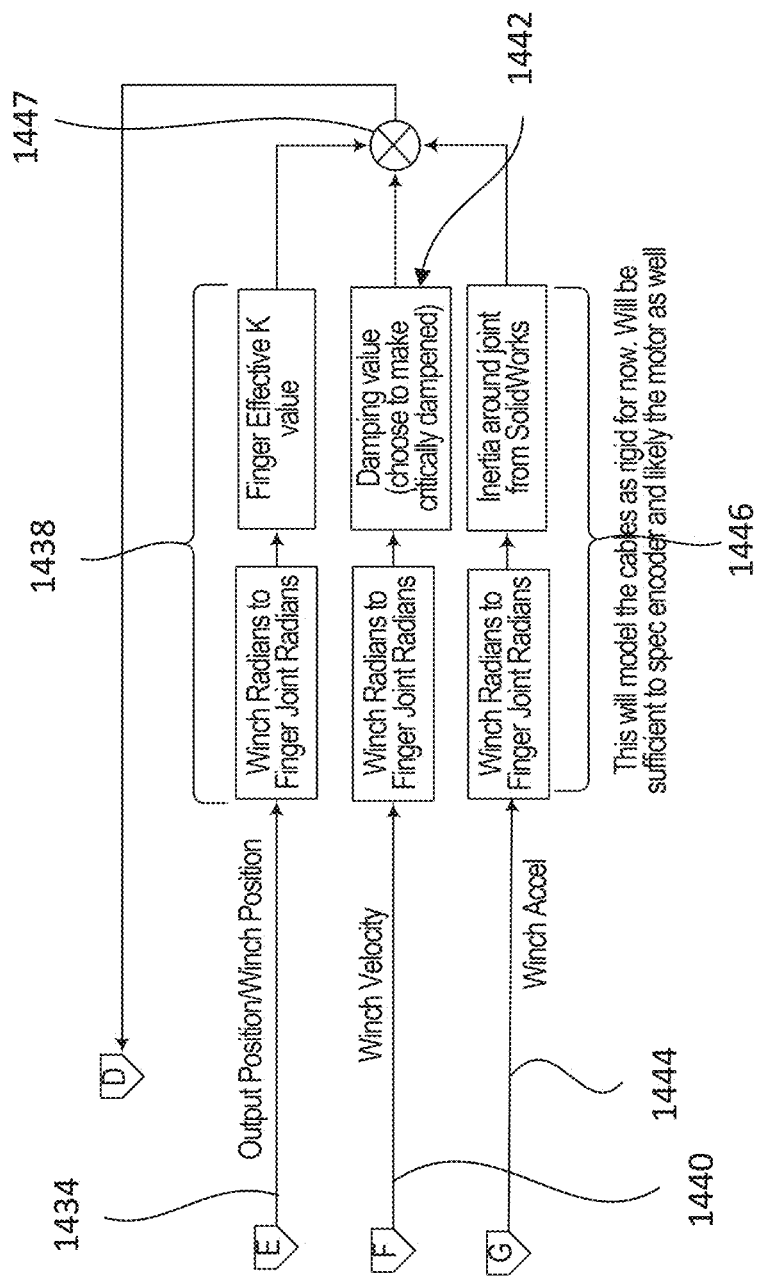

FIGS. 14A, 14B, and 14C illustrate, schematically, a control system 1400 for an end-effector such as an end-effector including device 500. Control system 1400 may be used to control slip or slippage of item items under prehension, e.g., item 702. Slips includes two types: incipient slips and gross slips. In an incipient slip there is a loss of contact for a portion of some contact area between an item under prehension and an end-effector. If an incipient slip is not corrected, e.g., by control system 1400, then a gross slip will likely happen. If a gross slip is not corrected, then the end-effector may lose the item (e.g., drop item into on near input space 408) or at least item reorient in the end-effector. For the latter that is, change pose but reach a new stable configuration in the end-effector.

Control system 1400 includes a plurality of inputs, for example grip force 1402, tactile sensor input 1404, and position set point 1406. The grip force 1402 may be an initial grip force. Control system 1400 provides grip force 1402 to grip force controller 1408, the output of which is provided to a signal multiplexer 1410. Control system 1400 provides tactile sensor input 1404 to grip force estimator 1412. The tactile sensor input 1404 may include a plurality of values from a spatial array of force or pressure sensors disposed on the item facing parts of the end-effector. The grip force estimator 1412 can use the tactile sensor input 1404 to find a grip force value and provide the grip force value to the grip force controller 1408, an anti-slip controller 1414, and a mode selector 1416. Operation of the anti-slip controller is described herein at least in relation to FIG. 16.

The output of the anti-slip controller 1414, and a mode selector 1416 are provider to the signal multiplexer 1410. Control system 1400 provides the position set point 1406, to the mode selector 1416 and a filter 1418. The output of filter 1418 is provided to a position controller 1420 and then a position integral controller 1422. The position controller 1420 also receives as input a feedback signal from downstream parts of system 1400 via mixer 1421. The position integral controller 1422 also receives as input a feedback signal from downstream parts of system 1400 via mixer 1423.

The signal multiplexer 1410 provides output to a smoothing filter 1424 and then smoothed output is provided to a motor coil current set point 1426, a pass-through node. The control system 1400 feeds the motor coil current set point 1426 to a motor or motor/servo controller 1428. The motor controller 1428 controls an electromechanical motor system 1430. The electromechanical motor system 1430 includes a motor 1432. The electromechanical motor system 1430 provides one or more outputs. As illustrated, the outputs include a motor position output 1434 of motor angular position θ. The control system 1400 may provide output from the electromechanical motor system 1430 to parts of the system downstream from position set point 1406. This output can be digitized at analog to digital encoder 1436. The outputs from electromechanical motor system 1430 may include a motor velocity output 1440 for motor angular velocity co. As illustrated the outputs include a motor acceleration output 1444 for motor angular acceleration α.

Figure 15:
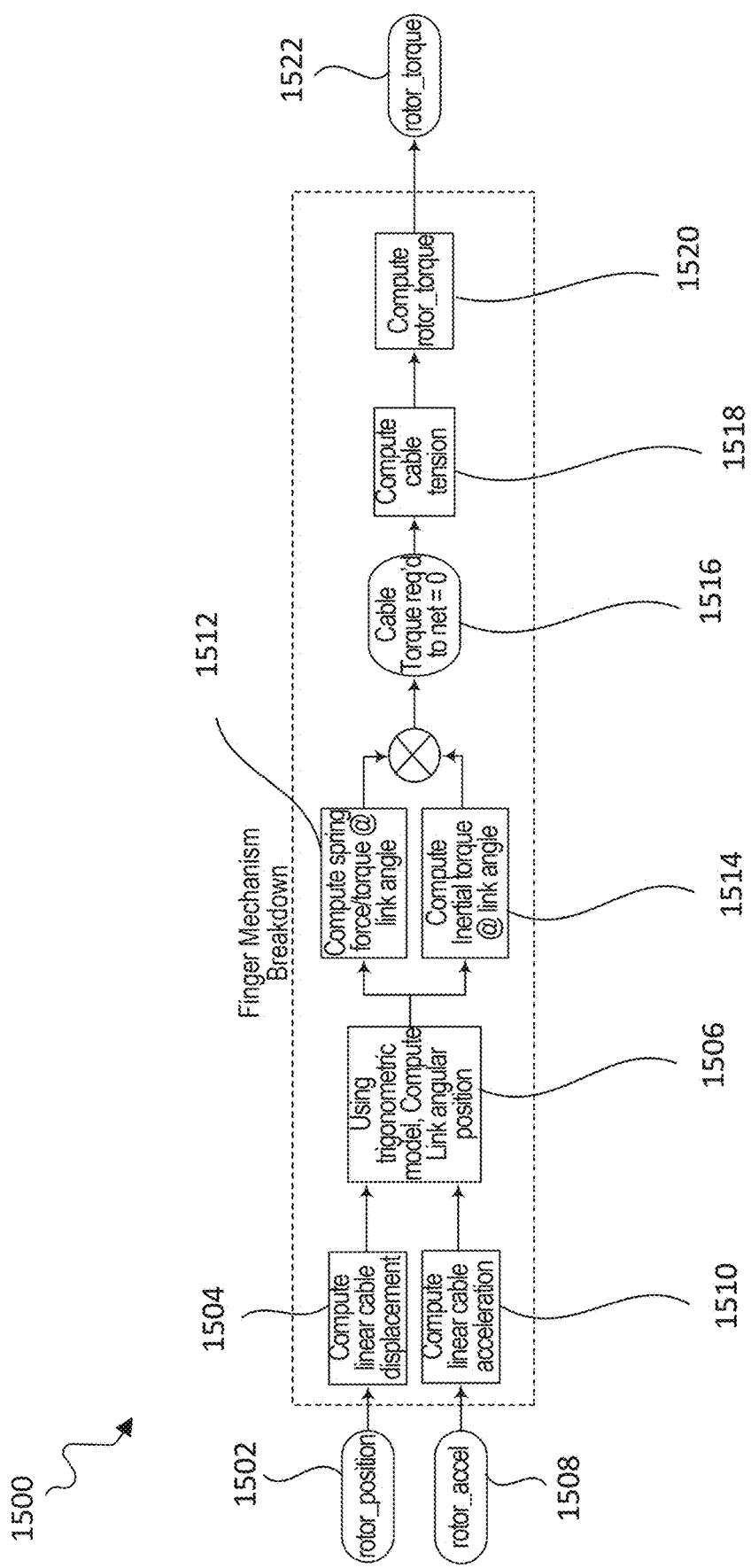
FIG. 15 illustrates, schematically, an exemplary part of the control system of FIG. 14.

The control system 1400 may process the motor position output 1434 at blocks 1438. An example of processing at blocks 1438 is shown in FIG. 15. The control system 1400 may process the motor velocity output 1440 at blocks 1442. The control system 1400 may process the motor acceleration output 1444 at blocks 1446. An example of processing at blocks 1446 is shown in FIG. 15. The output of one or more of blocks 1438, 1442, and 1446 is provided to the electromechanical motor system 1430 as a feedback loop via mixer 1447.

FIG. 15 illustrates, schematically, an exemplary system 1500 that implements blocks 1438, and 1446 shown and described in FIG. 14. System 1500 includes a pair of inputs 1502 and 1508. Input 1502 includes motor angular position θ such as motor position output 1434 optionally with preprocessing. Input 1508 includes motor angular acceleration α, such as, motor acceleration 1444 optionally with preprocessing. System 1500 provides the input 1502 to a tendon length estimator 1504 that computes a value for length of tendon d. System 1500 provides the input 1508 to a tendon acceleration estimator 1510 that estimates a value for the acceleration of tendon d". The tendon length estimator 1504 and the tendon acceleration estimator 1510 provide input to a link position estimator 1506. The link position estimator 1506 uses trigonometry and the output d from the length estimator 1504 to estimate the positions of one or more links in an end-effector.

System 1500 includes a spring torque estimator 1512 and an inertial torque estimator 1514. The spring torque estimator 1512 estimates the torque provided by one or more springs at one or more joints between links. The inertial torque estimator 1514 estimates the torque imparted by one or more links on one more joints between links in the end-effector.

System 1500 generates a torque value 1516 that defines a net torque value which cancels the spring torque and inertial torque at one or more joints between links in one or more fingers. System 1500 includes a tendon tension estimator 1518 that finds a corresponding cable tension to match the torque value 1516. System 1500 includes a rotor torque estimator 1520 that finds a corresponding rotor torque value 1522 for the corresponding cable tension. The rotor torque value 1522 may be provided as input by a controller of system 1500 as input to electromechanical motor system 1430 of system 1400.

Figure 16:
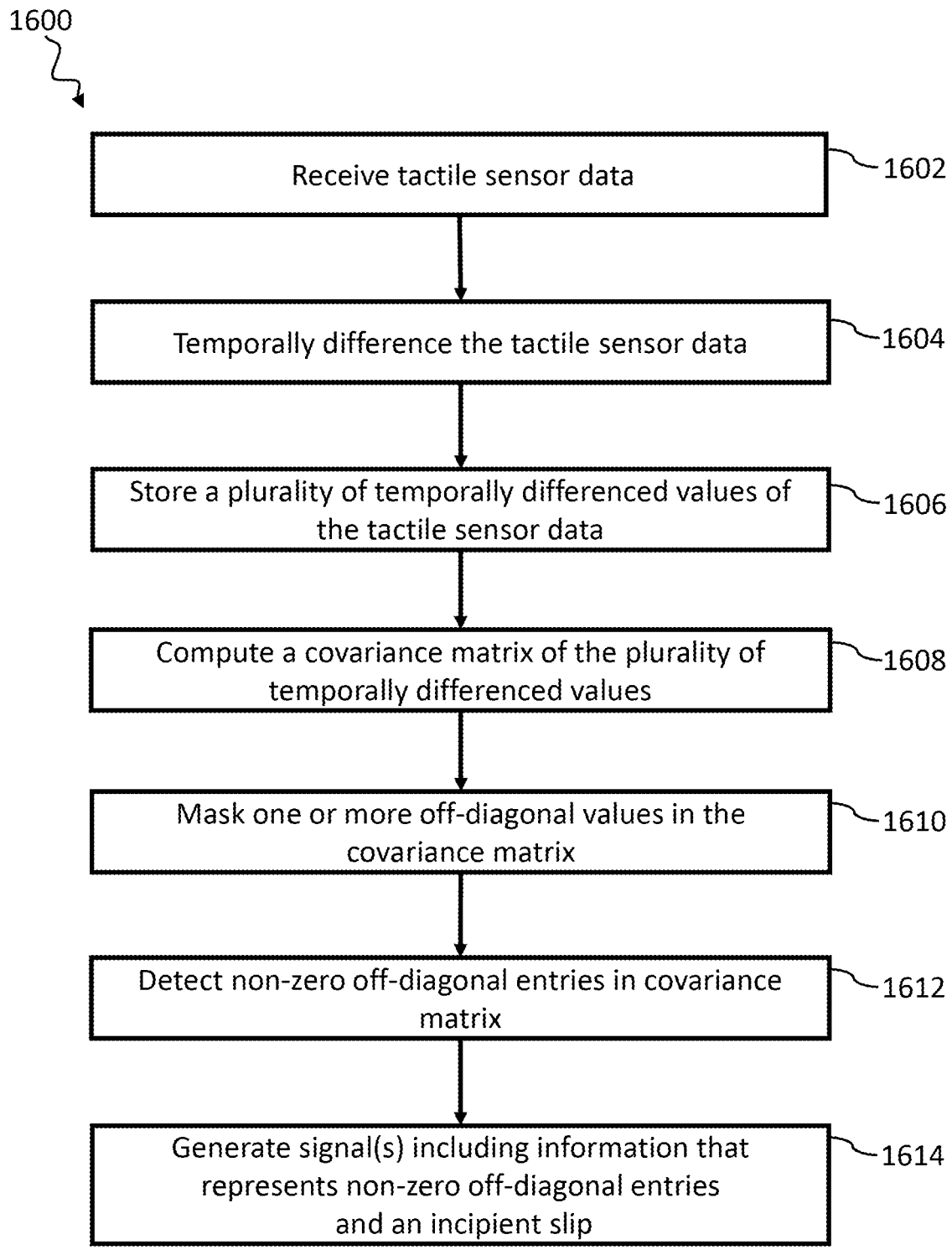
FIG. 16 is a flow-diagram illustrating an implementation of a method of operation for a system including an end-effector and tactile sensors.

FIG. 16 shows method 1600 executable by a controller, such as circuitry or at least one hardware processor, for operation in a robotic system. Method 1600, in part, describes how a controller may estimate an incipient slip. Those of skill in the art will appreciate that other acts may be included, removed, and/or varied or performed in a different order to accommodate alternative implementations. Method 1600 is described as being performed by a controller, for example, a control subsystem or processor(s) in computer system 106 or system 200, in conjunction with other components, such as those found in, system 100, computer system 106, robot 200, system 300, and system 1400. However, method 1600 may be performed by multiple controllers or by another system.

Method 1600 begins, for example, in response to an invocation by the controller.

At 1602, the controller receives tactile sensor data, e.g., tactile sensor input 1404, from a plurality of tactile sensors. The controller may receive the tactile sensor data indirectly. For example, the controller may obtain the tactile sensor data from a storage device like storage device(s) 208. The plurality of tactile sensors may include force or pressure sensors. The plurality of tactile sensors can include a plurality of tactel (i.e., tactile element) in a regular or irregular spatial extent on one or more surfaces of an end-effector. The tactile sensor data may include a plurality of spatial values and a plurality of temporal values. Without loss of generality each sensor in the plurality of tactile sensors may be indexed by spatial index i and temporal index j.

At 1604, the controller temporally differences the tactile sensor data. For example, $d_i^j = F_i^j - F_i^{j-1}$ is the difference between the current force value at location i and a previous force value at the same location. The force values could be time separated by about 0.1 seconds, e.g., $\Delta t^j = t^j - t^{j-1}$. In some implementations, the controller obtains a plurality of difference values by differentiating a signal from a tactel and sampling the differentiated signal.

At 1606, the controller stores (e.g., keeps) a plurality of temporal difference values. For example, the controller stores (e.g., store in a processor readable storage device) a predetermined number of consecutive past inputs. In some implementations, the controller stores past inputs in a non-consecutive way for example, a series of consecutive points followed by increasing gaps. The controller may store the defined number of temporal values in a matrix $D = [d_1^k \ldots d_i^k \ldots d_n^k]_{k=j-m}^{j}$ where k is a temporal label for the vectors $d_i^k$ and m is a number of stored values.

At 1608, the controller computes a covariance matrix $C = D\,D^T$ where the diagonal entries are the variance in the spatial locations of the tactile sensor data and the off-diagonal entries and the co-variances over the period defined by m. In some implementations, the controller retains ten stored values, e.g., m=10.

At 1610, the controller masks any off-diagonal entries that have pathological co-variances. Two tactile sensors could have pathological co-variances. For example, the tactels in a masked pair may be always on due to defects. The controller may mask any co-variances. In some implementations, the controller masks (or creates a set of masked pairs) pairs of tactile sensor data in the tactile data from a plurality of tactile sensors.

At 1612, the controller detects non-zero off-diagonal entries. The controller may implement a norm over the non-masked (if masked entries are present) entries in the covariance matrix. Examples of norms include $L_2$ norm and $L_\infty$ norm. In some implementations, the controller detects a value of one or more off-diagonal entries in the covariance matrix.

At 1614, the controller generates a signal including information that represents non-zero off-diagonal entries and an incipient slip. The controller may send the signal including information that represents the non-zero off-diagonal entries and the incipient slip through a communication channel, e.g., network or non-network communication channel 108. The controller may use the signal including information that represents the non-zero off-diagonal entries and the incipient slip to tighten the grip on an item by the plurality of fingers, e.g., tighten plurality of fingers 508. The controller may use the signal including information that represents the non-zero off-diagonal entries and the incipient slip to activate an adhesion gripper, e.g., electrostatic adhesion device 1100.

Method 1600 ends, for example following 1612, until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor-based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/ or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The teachings of U.S. provisional patent application Ser. No. 62/473,853 filed Mar. 20, 2017 and U.S. provisional patent application Ser. No. 62/515,910 filed Jun. 6, 2017 are incorporated herein by reference, in their entireties. The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
a base;
an actuator coupled to the base;
an adhesion gripper coupled to the base, wherein the adhesion gripper comprises a gripper face defining one or more fluid ports configured to generate an airstream to produce a localized low-pressure region adjacent the gripper face, which creates an attractive lifting force toward the gripper face to draw an item toward the gripper face, wherein the adhesion gripper includes a plurality of standoffs on the gripper face that prevent the gripper face and the item from mating; and
a first underactuated finger coupled to the base, wherein the first finger includes:
  a proximal link coupled to the base, wherein the proximal link comprises:
  a distal end; and
  a guide for a first tendon spaced a first distance away from the distal end of the proximal link;
  a distal link coupled to the proximal link and which extends along a first axis, the first axis being an axis that intersects a joint that couples the distal end of the proximal link to a proximal end of the distal link, wherein the distal link comprises:
  a distal pad disposed on a volar side of the first axis;
  a node sized and shaped to receive a first tendon; and
  a lever arm disposed on a proximal side to the distal pad and which extends in a volar direction from the first axis to the node; and
  wherein the first underactuated finger is closable and releasable, by respective contraction and release of the first tendon by the actuator, around an item engaged by the adhesion gripper.

2. The device of claim 1 further comprising:
a first revolute joint compliant in a first direction disposed between the base and the proximal link; and
a second revolute joint compliant in the first direction disposed between the proximal link and the distal link.

3. The device of claim 2 further comprising:
a first spring that biases the proximal link to a first open position; and
a second spring that biases the distal link to a second open position.

4. The device of claim 3 wherein:
a first net torque biases the proximal link to the first open position;
a second net torque biases the distal link to the second open position; and
the first net torque is less than the second net torque.

5. The device of claim 3 wherein:
a first tensile force along the first tendon actuates the proximal link relative to the base;
a second tensile force along the first tendon actuates the distal link relative to the proximal link; and
the first tensile force is less than the second tensile force.

6. The device of claim 1 wherein the proximal link further comprises:
a proximal pad disposed on a volar side of the proximal link.

7. The device of claim 1 further comprising:
a second finger.

8. A system comprising:
a base;
an actuator coupled to the base;
an adhesion gripper coupled to the base, wherein the adhesion gripper comprises a gripper face defining one or more fluid ports configured to generate an airstream to produce a localized low-pressure region adjacent the gripper face, which creates an attractive lifting force toward the gripper face to draw an item toward the gripper face, wherein the adhesion gripper includes a plurality of standoffs on the gripper face that prevent the gripper face and the item from mating; and
a plurality of fingers coupled to the base, wherein at least one of the plurality of fingers includes:

a proximal link comprising a first body and a guide;
a first joint that couples the proximal link to the base, wherein the first joint is compliant in a first direction;
a distal link comprising:
 a first axis, the first axis being an axis that intersects a joint that couples the distal end of the proximal link to a proximal end of the distal link;
 a node sized and shaped to receive a first tendon;
 a distal pad disposed on a volar side of the first axis; and
 a lever arm disposed on a proximal side to the distal pad and which extends in a volar direction from the first axis to the node; and
a second joint that couples the distal link to the proximal link; and
a plurality of tendons, wherein a first respective tendon in the plurality of tendons:
 is associated with a first respective finger of the plurality of fingers;
 couples to a first lever arm of a first distal link of the first respective finger;
 routes through a first guide included in a first proximal link of the first respective finger; and
 couples to the actuator; and
 wherein the plurality of fingers is closable and releasable, by respective contraction and release of the respective plurality of tendons by the actuator, around an item engaged by the adhesion gripper.

* * * * *